US010690804B2

(12) United States Patent
Zibold

(10) Patent No.: US 10,690,804 B2
(45) Date of Patent: Jun. 23, 2020

(54) METHOD FOR OPERATING AN IMAGING LOCATION DEVICE AND IMAGING LOCATION DEVICE

(71) Applicant: Robert Bosch GmbH, Stuttgart (DE)

(72) Inventor: Tobias Zibold, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 542 days.

(21) Appl. No.: 15/320,785

(22) PCT Filed: Jun. 25, 2015

(86) PCT No.: PCT/EP2015/064418
§ 371 (c)(1),
(2) Date: Dec. 21, 2016

(87) PCT Pub. No.: WO2015/197774
PCT Pub. Date: Dec. 30, 2015

(65) Prior Publication Data
US 2017/0153356 A1    Jun. 1, 2017

(51) Int. Cl.
*G01V 9/00* (2006.01)
*G01C 15/02* (2006.01)
(Continued)

(52) U.S. Cl.
CPC .............. *G01V 9/00* (2013.01); *G01C 15/02* (2013.01); *G01V 3/10* (2013.01); *G01V 3/17* (2013.01);
(Continued)

(58) Field of Classification Search
USPC ......................................................... 702/150
See application file for complete search history.

(56) References Cited

U.S. PATENT DOCUMENTS 5,886,775 A * 3/1999 Houser ................ G01S 5/0247
356/4.01
6,360,173 B1 * 3/2002 Fullerton ............... G01V 1/005
702/14
(Continued)

FOREIGN PATENT DOCUMENTS

AU       2003234849 B1    8/2004
DE   10 2008 043 190 A1   4/2010
(Continued)

OTHER PUBLICATIONS

International Search Report corresponding to PCT Application No. PCT/EP2015/064418, dated Sep. 21, 2015 (German and English language document) (5 pages).

*Primary Examiner* — Paul D Lee
(74) *Attorney, Agent, or Firm* — Maginot, Moore & Beck LLP

(57) ABSTRACT

The disclosure relates to a method for operating an imaging location device by which at least two-dimensional map information is generated by location of concealed location objects under an examination surface. It is proposed that a handling instruction for guiding the location device is derived using an evaluation unit of the location device from positioning data determined by means of a location unit of the location device and/or from position data determined by means of a position sensor of the location device and/or from system parameters of the location device, in order to obtain optimized accrual of map information relating to the location.

14 Claims, 7 Drawing Sheets

(51) Int. Cl.

| | |
|---|---|
| G01V 3/17 | (2006.01) |
| G01V 3/175 | (2006.01) |
| G01V 8/00 | (2006.01) |
| G01V 3/10 | (2006.01) |
| G06K 9/22 | (2006.01) |
| G06T 11/60 | (2006.01) |
| G06F 1/00 | (2006.01) |
| G01V 3/15 | (2006.01) |

(52) U.S. Cl.
CPC ............. *G01V 3/175* (2013.01); *G01V 8/005* (2013.01); *G06K 9/22* (2013.01); *G06T 11/60* (2013.01); *G01V 3/15* (2013.01); *G06F 1/00* (2013.01); *G06F 2101/00* (2013.01); *G06K 2207/00* (2013.01); *G06K 2209/09* (2013.01)

(56) References Cited

U.S. PATENT DOCUMENTS

| | | | |
|---|---|---|---|
| 7,443,154 | B1 | 10/2008 | Merewether et al. |
| 8,638,446 | B2 * | 1/2014 | Briggs ................ G01C 15/002 |
| | | | 33/503 |
| 2006/0085049 | A1 * | 4/2006 | Cory .................... A61B 5/0536 |
| | | | 607/48 |
| 2006/0237652 | A1 * | 10/2006 | Kimchy .................. A61B 1/05 |
| | | | 250/363.02 |
| 2010/0097212 | A1 | 4/2010 | Wingate et al. |
| 2011/0243476 | A1 * | 10/2011 | Sieracki ................... G01V 3/15 |
| | | | 382/291 |
| 2013/0182167 | A1 * | 7/2013 | Haldner ................ G01V 3/165 |
| | | | 348/333.05 |
| 2014/0276001 | A1 * | 9/2014 | Ungi .................... A61B 8/0841 |
| | | | 600/424 |
| 2015/0011896 | A1 * | 1/2015 | Yelin .................... A61B 5/0066 |
| | | | 600/476 |

FOREIGN PATENT DOCUMENTS

| | | |
|---|---|---|
| JP | 2003-98263 A | 4/2003 |
| JP | 2005-518549 A | 6/2005 |
| JP | 2006-64420 A | 3/2006 |
| JP | 2008-232803 A | 10/2008 |
| JP | 2012-506055 A | 3/2012 |
| WO | 03/073133 A1 | 9/2003 |
| WO | 2009/148524 A2 | 12/2009 |

* cited by examiner (a)

(b)

(a)

(b)

METHOD FOR OPERATING AN IMAGING LOCATION DEVICE AND IMAGING LOCATION DEVICE

This application is a 35 U.S.C. § 371 National Stage Application of PCT/EP2015/064418, filed on Jun. 25, 2015, which claims the benefit of priority to Serial No. DE 10 2014 212 131.0, filed on Jun. 25, 2104 in Germany, the disclosures of which are incorporated herein by reference in their entirety.

BACKGROUND

DE 10 2008 043 190 has already proposed a method for locating objects in an examination article, in which at least one movement characteristic of a movement sensor unit and at least one locating characteristic of a locating unit are evaluated together.

SUMMARY

The disclosure proceeds from a method for operating an imaging locating device, in which an at least two-dimensional map information item is generated by locating objects to be located which are concealed under an examination surface.

It is proposed that, using an evaluation apparatus of the locating device, an instruction for guiding the locating device is derived from locating data established by means of a locating apparatus of the locating device and/or from position data established by means of a position sensor of the locating device and/or from system parameters of the locating device in order to obtain an optimized gain of locating-related map information items.

An imaging locating device should be understood to mean, in particular, an apparatus which serves to locate objects to be located which are concealed under an examination surface. The locating device is advantageously provided to carry out by repositioning, in particular as a consequence of displacing or shifting in relation to the examination surface, a successive examination and measurement of the examination surface in respect of objects to be located which are concealed under the examination surface. Furthermore, the locating device preferably serves to output at least measurement results, in particular locating results, in the form of an intuitively understandable map and constitutes an "imaging" locating device within this meaning. Therefore, "imaging" characterizes, in particular, the capability of the locating device to provide a graphic illustration of the locating results, in particular of an at least two-dimensional map information item, as a consequence of a locating process and, preferably, output this to a user of the locating device.

Repositioning should be understood to mean, in particular, a displacement, movement, shift, rotation, turn or other change in the position and/or alignment of the locating device, carried out in any direction, in relation to the examination surface.

An examination surface should be understood to mean, in particular, a surface of an article or workpiece to be examined in respect of concealed objects to be located. By way of example, and not exhaustively, the workpiece can be building materials, a wall, a floor, a ceiling, screed, an organic entity (in particular parts of a body as well) and/or parts of a terrain. By way of example, the article or the workpiece may consist of, in particular, wood, glass, plastic, concrete, stone, brick, gypsum, metal, organic materials or the like. Moreover, in principle, it is also possible to examine liquids. Exemplary objects to be located are represented by inclusions in a material, which differs from the material of the article to be examined or the physical properties of which differ from those of the material of the article to be examined. Typical examples of such objects to be located are power lines, pipes, gas lines, cavities, reinforcements or the like, which are concealed in a building wall.

To carry out the locating process, the imaging locating device comprises at least a locating apparatus provided to detect locating data in relation to objects to be located which are concealed under an examination surface. Preferably, direct contact, in particular tactile contact, between the locating apparatus and an object to be located is not required during the locating process. A locating apparatus should be understood to mean, in particular, an apparatus which has means which are provided to detect physical and/or chemical variables, which allow the presence of an object to be located to be deduced, and convert these variables into an electrically evaluable signal. Preferably, a locating apparatus is provided to detect objects to be located which are concealed in a workpiece by evaluating an electric and/or magnetic field change or a change in the time-of-flight of radiation emitted into a material to be examined. In particular, the locating apparatus includes components required for operating the means, electric circuits and the like. Preferably, the means of the locating apparatus have a locating sensor from a group of sensors which comprises at least inductive sensors, for example eddy current sensors, pulse induction sensors, transmit-receive sensors or magnetic field sensors, and capacitive sensors, AC sensors, radar sensors, in particular ultra-broadband radar sensors and broadband impulse radar sensors, microwave sensors, ultrasound sensors, temperature sensors, impact-echo sensors, potential field sensors, resistance sensors, conductivity sensors, moisture sensors and NMR sensors or the like.

In particular, "provided" should be understood to mean, specifically, "programmed", "configured" and/or "equipped". An object being "provided" for a specific function should be understood to mean, in particular, that the object fulfills and/or carries out this specific function in at least one application and/or operating state, or it is configured to fulfill the function.

In particular, the locating apparatus, in particular a locating sensor of the locating apparatus, detects one or more sensor raw values $S_{k,n}$ at a respective measurement position of the locating device in relation to the examination surface, where the index k may denote various sensor values of the locating sensor and the index n denotes the association of the sensor raw value with the corresponding measurement position $(x_n, y_n)$ at which the sensor raw value was measured. The locating apparatus, in particular the means of the locating apparatus provided for operating the locating sensor, calculate sensor values $S_{m,n}$ from the raw values $S_{k,n}$ of the locating sensor. In the simplest case, the calculation is carried out by identical mapping; in more complex cases by linear mappings such as forming a sum, forming a difference, weighting, or else by nonlinear mapping such as assignment of classes. These sensor values $S_{m,n}$ represent the locating data, specified within the scope of this patent, of the locating apparatus.

The imaging locating device preferably has a position sensor for determining the respective measurement position. A position sensor should be understood to mean, in particular, an apparatus provided to determine the current position of the position sensor—preferably also an alignment of the position sensor—and hence of the locating device in relation to the examination surface and to output this in the form of position data to the locating device for further processing. Here, the current position and/or alignment may be detected in relative or absolute terms in relation to an earlier position and/or alignment, in particular in relation to at least one stationary reference point, in particular in relation to a stationary reference point which is independent of the locating device. In one preferred embodiment, the position sensor may be embodied as e.g. an optical and/or mechanical displacement sensor which, in one operating state, detects a movement and/or rotation of the locating device on the examination surface. Alternatively, or additionally, the position sensor may also be based on different measurement methods appearing expedient to a person skilled in the art, for example using an inertial sensor system or in the configuration of an ultrasound sensor, a barometric sensor or a GPS sensor. In particular, the position sensor may comprise one or more sensors from a group of sensors which comprise sensors which are sensitive to, at least, inclination, angle, distance, translation, acceleration and rotation rate. The position data established and output by the position sensor relate at least to coordinates in two directions which determine the position of the position sensor, and hence of the locating device, on the examination surface, for example represented as an at least two-dimensional coordinate pair ($x_n$, $y_n$) related to the examination surface. Furthermore, it is also conceivable for the position data to be multidimensional coordinates which, for example, also take account of the alignment of the locating device in relation to the examination surface. The position data may be arranged uniformly over the examination surface in the form of a grid with equidistant spacings or preferably—following any path of the locating device in relation to the examination surface—be distributed irregularly over the examination surface.

An evaluation apparatus should be understood to be an apparatus which has an information input, an information processing unit and an information output. The information input serves to receive locating data established by means of the locating apparatus and position data established by means of the position sensor. The information processing unit serves to process, in particular evaluate, received data. The information output serves to forward or output the processed and/or evaluated data to further components of the locating device, in particular to a control apparatus and/or a memory apparatus and/or a data communication interface and/or a display apparatus. Advantageously, the evaluation apparatus has components which comprise at least one processor, a memory and an operating program with evaluation and calculation routines. In particular, the electronic components of the evaluation apparatus may be arranged on a circuit board. Particularly preferably, the electronic parts of the evaluation apparatus are realized in the form of a microcontroller. Furthermore, a control apparatus and the evaluation apparatus may also, particularly preferably, be configured as a single part. Alternatively, or additionally, the evaluation apparatus may also be configured as a single part with components of the display apparatus. The evaluation apparatus is at least provided to determine and/or provide, in particular to make available to a further component of the locating device for further processing, an at least two-dimensional map information item by assigning locating data of at least one locating apparatus to position data. The evaluation apparatus may furthermore preferably have evaluation routines for preparing and/or analyzing locating data and/or position data, in particular closed-loop control routines, open-loop control routines, analysis routines, calculation routines, assignment routines, conversion routines, statistical evaluation routines, filters and the like. In particular, the evaluation apparatus has at least mathematical routines which may find use within the scope of a mathematical optimization calculation, preferably e.g. numerical algorithms or the like.

An at least two-dimensional map information item constitutes a multidimensional, in particular pseudo-multidimensional, but at least two-dimensional evaluated and/or prepared information item about locating the objects to be located which are concealed under an examination surface. Here, the reference "at least two-dimensional" denotes the fact that a map information item contains an information item about objects to be located which are concealed under an examination surface in at least two directions, preferably in two orthogonal directions. Preferably, the two directions are assignable to the examination surface, for example on the basis of given and/or fixable reference points. Preferably, the two directions extend in a plane of the examination surface, in particular along the examination surface and/or in a plane arranged parallel to the examination surface. Preferably, an at least two-dimensional map information item at least comprises information about objects to be located which are concealed under an examination surface, said information being correlated with two-dimensional position data of the locating device in relation to the examination surface at the locating time of locating. Preferably, within the scope of this patent, an at least two-dimensional map information item should be understood to mean, in particular, correlated locating and position data provided to be output to a user of the locating device, at least partly in the form of a map, by means of a display apparatus. An at least two-dimensional map information item may relate, in particular, to information or measurement values of the locating apparatus directly related to measurement, for example amplitudes, phase shifts, relaxation times or the like. Alternatively, an at least two-dimensional map information item may also relate to interpreted and/or prepared information such as directional information, qualitative signal strengths of a locating signal, depth information, yes/no statements in relation to an existence of an object to be located, or the like. In a preferred embodiment, the at least two-dimensional map information item may be processed and/or stored and/or output in the form of an, in particular multidimensional, matrix, table, array, list or the like. In particular, the at least two-dimensional map information item, preferably in the form of a matrix, table, array, list or the like, is successively extended and/or updated and/or refined and/or overwritten as a consequence of a repositioning of the locating device in relation to the examination surface.

Preferably, the at least two-dimensional map information item represents an interpolated and/or extrapolated two-dimensional map information item, in which locating information items are established by means of interpolation or extrapolation routines in the evaluation apparatus, at least for some of the regions of the two-dimensional map information item for which no locating data were previously available. To this end, use is preferably made of locating data of regions of the at least two-dimensional map information item in the vicinity of the region without locating data for the purposes of calculating interpolated or extrapolated locating information for the region without locating data. In particular, the evaluation apparatus is provided to interpolate locating data from a spatial vicinity of a region for establishing an interpolation value and, in a manner weighted therewith, the locating data from the vicinity of this region. In particular, the regions of the map information should also be understood to mean individual fields or grid points of the at least two-dimensional map information item arranged in a matrix structure or subdivided into a grid.

Preferably, the at least two-dimensional map information item $K_{\mu v, xy}$ is calculated on a preferably equidistant grid of position coordinates (grid points) from the already established locating data $S_{m,n}$ (i.e. processed sensor values) by means of the locating device, in particular the evaluation apparatus thereof. To this end, locating data $S_{m,n}$ are interpolated from already measured locating data at measurement positions $R_n$, preferably for those grid points (synonymously: position coordinates) for which there are as of yet no locating information items as a consequence of a locating process and which lie within a convex envelope of the already examined measurement positions—represented by the set of position data $R_n=(x_n, y_n)$. Alternatively, or additionally, there may also be an extrapolation of locating data from already measured locating data at measurement positions $R_n$ for those grid points (position coordinates) for which there are as yet no locating information items as a consequence of a locating process and which lie outside of the convex envelope of the already examined measurement positions $R_n$. Here, "interpolation" should be understood to mean all usable, in particular expedient, types of known interpolation algorithms, by means of which locating data from a vicinity of a region can be interpolated for establishing an interpolation value for this region. Advantageously, it is possible to use locating data drawn both from the close vicinity of grid points, for which an interpolation should be carried out in each case, and from further out for the purposes of estimating interpolated locating data for the at least two-dimensional map information item $K_{\mu v, xy}$. Examples of such interpolation algorithms represent linear and/or higher-order, in particular nonlinear interpolation algorithms, in particular interpolation algorithms on the basis of a Delaunay triangulation, on the basis of Kriging or inverse-distance weighting, and interpolation algorithms on the basis of a Voronoi interpolation (nearest neighbor interpolation). Furthermore, as a matter of principle, use can also be made of radar and/or ultrasound imaging methods, such as a "synthetic aperture focusing technique" (SAR, SAFT).

Preferably, provision can moreover be made of an at least two-dimensional map information item $K_{\mu v, xy}$, which contains the information as to whether locating data and/or a plurality of locating data are available at the grid points (position coordinates of the grid), preferably at arbitrary measurement positions. In this manner, this embodiment of an at least two-dimensional map information item constitutes an information item indicating whether locating data are already present for a region of possible measurement positions (position data) or whether a significant amount of locating data is already present for a region of possible measurement positions.

What is proposed according to the disclosure is that, using the evaluation apparatus of the locating device, an instruction for guiding the locating device is derived from locating data established by means of the locating apparatus and/or from position data established by means of the position sensor and/or from system parameters of the locating device in order to obtain an optimized gain of locating-related map information items.

Hence, advantageously, an instruction for guiding the locating device is derived in the method according to the disclosure from available data, in particular from locating data and/or position data and/or system parameters. Here, the instruction for guiding the locating device represents an information item provided to be output to a user of the locating device, said information providing the user with specific instructions as to how, in particular in which direction, the locating device needs to be guided, i.e. repositioned, in order to obtain an optimized gain of locating-related map information. In this way, the instruction may be understood to be context-sensitive and/or situation-dependent user guidance for the locating device, which simplifies the operation of the locating device for the user and, in particular, permits fast and efficient locating of objects to be located which are concealed under an examination surface. Advantageously, at a given time, the instruction instructs a user of the locating device about, in particular, necessary and/or expedient measurement steps to be subsequently carried out, i.e., in particular, about recommended measurement positions at which a further locating measurement should advantageously be carried out.

System parameters should be understood to mean all necessary or expedient information items which characterize the properties of the locating device. Preferably, such system parameters are already known and/or determinable prior to a locating process. By way of example, system parameters may be information items characterizing the components of the locating device which constitute substantial influencing variables and/or constants in relation to the functionality of the locating device and/or the results thereof. By way of example, a typical system parameter may relate to an accuracy and/or tolerance specification in relation to a measurement accuracy of the locating apparatus or in relation to a processing speed of the evaluation apparatus. Likewise, a typical system parameter may relate to information about properties of employed interpolation algorithms or the like. Preferably, the system parameters represent quantifiable variables.

According to the method, "gain of locating-related map information items" should be understood to mean the enhancement of an already available, at least two-dimensional map information item with further map information items which, in particular, were previously not available. Here, preferably, locating data in respect of those position data for which there previously was no locating information item as a consequence of a locating process at a corresponding measurement position and/or for which there previously was no locating information item as a consequence of an interpolation and/or for which there previously was no locating information item as a consequence of an extrapolation are included in the at least two-dimensional map information item.

"Optimized gain of locating-related map information items" should be understood to mean that, provided that the locating device is repositioned according to the method in accordance with the instruction for guiding the locating device, this has as a consequence an in particular improved, preferably amplified, particularly preferably maximized gain of locating-related map information items. In other words, the locating-related map information items may be particularly increased, preferably strongly increased, particularly preferably maximally increased in the case of, in addition to the already examined measurement positions $R_n$ on the examination surface, a given number of measurement positions on the examination surface which are to be approached by repositioning.

Preferably, depending on the situation, an optimized gain of locating-related map information items may therefore always be realized, in a particularly efficient manner, particularly quickly and in relation to a distance to be traveled on the examination surface by repositioning the locating device. Furthermore, the derivation of an instruction for guiding the locating device in the method according to the disclosure reduces the risk of incorrect operation of the locating device according to the disclosure since the user, depending on the situation, may be informed about upcoming repositioning steps, in particular also in respect of the direction thereof, and may therefore be guided step-by-step for a successful application of the locating device. The method according to the disclosure therefore allows the user of the locating device according to the disclosure to operate the corresponding locating device in a reliable and expedient manner, even in the case of complicated locating conditions.

Moreover, the method according to the disclosure facilitates the calculation of information for imaging locating devices and the implementation thereof in the form of a concrete instruction for the user for the purposes of guiding the locating device, this rendering it possible to bring about and/or achieve a quick improvement in the quality, which also requires little outlay from the user, of the measured locating data—and hence also an improvement in the quality of the displayed locating data in the case of a graphical output of the locating data to a user of the locating device. Advantageously, a user is protected from errors when using the imaging locating device, and furthermore when interpreting the measurement results, in particular because concealed articles, for example reinforcements, pipes, cables or the like in a wall, are found more reliably.

In a preferred embodiment of the method according to the disclosure for operating an imaging locating device, the instruction is calculated by optimizing a target function using the evaluation apparatus.

Advantageously, the mathematical complex problem of deriving and finding an instruction for guiding the locating device, with which an optimized gain of locating-related map information items is facilitated, may be carried out in the method according to the disclosure by means of the mathematical optimization method. By defining and subsequently optimizing a target function, a solution to the mathematically complex problem underlying the derivation of the instruction may be found in an advantageously simple and quick manner. In particular, the problem to be solved of deriving the instruction consists of the optimization of a system consisting of defined, in particular situation-dependent, parameters. Therefore, particularly preferably, a solution of the optimization problem, and hence the derivation of the instruction for guiding the locating device, with which an optimized gain of locating-related map information items is facilitated, may be reduced to a numerical method.

Here, in particular, optimization should be understood to mean that a best achievable result under the given, situation-dependent conditions is obtained within the meaning of a compromise between the parameters or properties characterizing the situation-dependent conditions.

In order to carry out the method according to the disclosure, a target function is set or defined, said target function preferably defining a quality of the present at least two-dimensional map information item from the available data, in particular from locating data and/or from position data and/or from system parameters. What is established by optimization of the target function, in particular by a linear and/or nonlinear optimization of the target function, is the addition of which data, in particular the addition of locating data at which further "recommended" measurement positions, allows the quality preferably to be improved, particularly preferably to be maximized. Advantageously, boundary conditions may be taken into account here by the precise configuration, in particular the precise definition, of the target function.

In a preferred embodiment of the method according to the disclosure for operating an imaging locating device, the instruction is calculated by optimizing a target function taking account of at least one parameter of a group of parameters, said group of parameters at least comprising:
  a distribution of the position data of the locating device,
  a signal-to-noise ratio of the locating data at different positions of the locating device in relation to the examination surface,
  a priori knowledge about properties of employed evaluation and/or interpolation algorithms,
  a deviation in the correlation of adjacent locating data, knowledge obtained a priori and/or during the locating process about probabilities of deviations between an expected position and an actual position of the locating device in relation to the examination surface.

In particular, "calculating a target function taking account of a parameter" means that the corresponding parameter is included in the target function to be optimized and hence there is a mathematical dependence of the target function—and therefore also of the obtained solution—on the corresponding parameter.

Here, the parameters from the group of parameters may be taken into account in the target function individually or in combination. In particular, it should also be noted that a target function may be defined differently depending on established locating data and/or depending on established position data and/or depending on system parameters of the locating device and hence preferably in a manner adapted to a measurement situation, particularly preferably in a situation-related manner. What can be realized hereby is that the target function takes account of different parameters from at least the group of parameters individually or in different combinations, depending on the situation.

Preferably, a target function underlying the optimization may be designed to be selectable such that, in the method according to the disclosure, a different target function is used, either as a consequence of a manual selection by the user or as a consequence of an automatic selection by the locating device.

The aforementioned parameters each represent problems or boundary conditions, constraints in mathematical parlance, for the target function to be optimized. The target function is preferably optimized to take account of these parameters in order to derive an instruction which leads to an optimized gain of locating-related map information items adapted to the given, in particular situation-dependent, boundary conditions. In particular, the parameters represent the following boundary conditions:

Boundary condition 1: The further grid points for which locating data are intended to be calculated by means of interpolation are situated away from position data $R_n$ of already established locating data, the lower the reliability is of the locating data calculable at these grid points (synonymously: position coordinates) by interpolation and/or extrapolation. Therefore, smaller distances would be preferred in an optimization.

Boundary condition 2: The signal-to-noise ratio is low, for example due to the sensor or due to external influences, at certain positions $R_n$ at which locating data were already measured using the locating device. In this case, an increase of the signal-to-noise ratio is realizable by increasing the number of locating processes in the direct vicinity of the measurement positions $R_n$ of the already carried out locating processes or, alternatively, by increasing a measurement duration in the direct vicinity of the measurement positions $R_n$ of the already carried out locating processes. Thus, an increase of measurement positions and/or measurement durations in regions in which disadvantageous signal-to-noise ratios are present would be preferred in an optimization.

Boundary condition 3: Interpolation algorithms in part have preferred distributions in respect of the position data $R_n$ with associated locating data, for which they supply ideal interpolation results. Therefore, in the case where objects to be located extend in a certain direction, the selection of the interpolation algorithm or the selection of locating data to be interpolated by means of an interpolation algorithm may have an influence on the reliability of the interpolation results. Therefore, an interpolation of locating data extending in the direction of the preferred distribution would be preferred in an optimization.

Boundary condition 4: The position sensor supplies erroneous or only inaccurate position data, the errors of which may, in particular, add up over time. This may lead to deviation of the actual position of the locating device from an estimated intended position of the locating device. Locating values may therefore be assigned to wrong position data $R_n$.

In a preferred embodiment of the method according to the disclosure for operating an imaging locating device, the target function is defined as a sum of deviations of distance variables from an average distance variable, wherein a distance variable is calculated for each grid point of at least a subset of all grid points as average distance of the grid point from N next measurement positions $R_n$ and the average distance variable is calculated as average value of the distance variables.

In this manner, it is advantageously possible to evaluate whether the locating data at the measurement positions $R_n$, at which a locating process was already carried out, are suitable to complete the at least two-dimensional map information item by interpolation of neighboring locating data at the grid points of the at least two-dimensional map information item. To this end, in particular, the distances between the grid points and the measurement positions $R_n$ are used as a criterion. An average distance from all measurement positions $R_n$ is determined for each grid point. The optimization of the target function then leads to a solution, in particular to an instruction for guiding the locating device, for which, as a consequence of the following thereof, all average distances become the same for all grid points. Proceeding from the already available locating data at the measurement positions $R_n$, an optimized gain of locating-related map information items may be obtained by following the instruction obtained thus.

In this manner, the target function is defined taking into account the average distance between grid points, i.e. those position coordinates (grid points) of the at least two-dimensional map information item at which locating data were and/or are calculated by interpolation, and actual measurement positions $R_n$, i.e. the position data at which locating data have already been measured by locating. In the method according to the disclosure, an instruction is derived as a solution to the optimization problem by optimizing the target function, in particular by minimizing the target function. To the extent that a user guides the locating device in accordance with this instruction, this instruction renders it possible to obtain an optimized gain of locating-related map information items under addition of a given number, which is as small as possible, of further (recommended) measurements at measurement positions $R_n'$ which are to be carried out on the examination surface.

Various embodiments are conceivable for the number of (geometrically) closest measurement positions $R_n$, to which the average distance is calculated.

In a preferred embodiment of the method according to the disclosure for operating an imaging locating device, the distance variable is calculated as a minimum distance of a grid point from a closest measurement position $R_n$. N therefore corresponds to 1.

In an alternative preferred embodiment of the method according to the disclosure for operating an imaging locating device, the distance variable is calculated as average distance of a grid point from the totality of all measurement positions $R_n$. N therefore corresponds to the number of measurement positions, at which locating processes have already been carried out.

Furthermore, further expedient values for the number of closest measurement positions $R_n$ to which the average distance is calculated are conceivable, for example 2, 4 or the like.

Reference is made to the fact that "average distance" should be understood to mean an average distance within the meaning of statistics, e.g. a median, an arithmetic mean, a geometric mean, a harmonic mean, a quadratic mean, a cubic mean or the like. However, the average distance is not restricted to the specified examples. Therefore, moreover, other calculation prescriptions appearing expedient to a person skilled in the art for establishing an expected value of a frequency or probability distribution are also usable for defining the average distance in the method according to the disclosure.

In a preferred embodiment of the method according to the disclosure for operating an imaging locating device, the target function is defined as a distribution function, wherein the value of the distribution function at one location is scaled with the dispersion of the locating data in surroundings of the location and the scaling factor depends on a number of locating data in the surroundings.

In addition to already established locating data at the measurement positions $R_n$, further locating data should be established by further locating measurements at recommended measurement positions, in particular at further measurement positions $R_n'$, i.e. at measurement positions calculated by means of the optimization method, in order to advantageously be able to enhance the at least two-dimensional map information item with these locating data. A target function is defined from the already available locating data, the idea underlying said target function being that of determining, by optimization, further "recommended" measurement positions which are afforded a particular meaning in respect of the map information item to be created. In particular, the target function is preferably defined by means of a statistical distribution function, which has included therein a spatial density of already measured locating data at measurement positions $R_n$ and the dispersion thereof within defined, predeterminable surroundings of a possible further measurement position for a possible measurement position to be calculated. The possible measurement position should be understood to mean any further measurement position, i.e., in particular, any position coordinates, which, in particular, are independent of a grid. Hence, proceeding from a property distribution of the already established locating data, for example defined as the number of sequences of locating data in the vicinity of a grid point which are identifiable as clearly as possible, the target function may be defined and optimized. Preferably, this is how great importance is assigned to possible measurement positions which, in the defined surroundings thereof, have a high density of already measured locating data, particularly preferably a high dispersion. Particularly preferably, further possible measurement positions in the vicinity of these possible measurement positions are assigned even greater importance. The optimization, in particular maximization, of this target function provides those recommended measurement positions $R_n'$ of a predetermined number, the inclusion of which in a locating process results in an optimized gain of locating-related map information items. The recommended measurement positions $R_n'$ in this case initially lie in the vicinity of already selected measurement positions, in the defined surroundings of which a high density of measured locating data, preferably a high dispersion, is already present. Furthermore, some further recommended measurement positions $R_n'$, which lie outside the defined surroundings, are preferably calculated. The correlation of the locating data with locating data previously recorded in these surroundings particularly advantageously permits a particularly good determination of positional deviations and the reduction thereof.

In a preferred embodiment of the method according to the disclosure for operating an imaging locating device, the instruction is calculated using the evaluation apparatus as at least one trajectory, along which the locating device should be guided in order to obtain an optimized gain of locating-related map information items.

In particular, the at least one trajectory should be understood to mean a path and/or a curve. Preferably, the at least one trajectory characterizes a path and/or a curve in relation to the examination surface. The at least one trajectory constitutes a preferred representation and/or implementation of the instruction, along which trajectory the locating device should be guided in order to obtain an optimized gain of locating-related map information items. Therefore, the at least one trajectory comprises at least those recommended measurement positions $R_n'$, the addition of which in the locating process yields an optimized gain of locating-related map information items. In particular, using the at least one trajectory renders it possible to display a temporal sequence of repositionings of the locating device to be carried out, i.e. a sequence of the recommended measurement positions $R_n'$ which should be selected by repositioning the locating device. Advantageously, the at least one trajectory facilitates a particularly intuitive display and interpretation of the instruction.

In particular, further trajectories may also be realized in addition to the at least one trajectory. By way of example, such a further trajectory may represent an updated trajectory and/or a trajectory which only covers a restricted region of the examination surface and/or a trajectory consisting of a plurality of individual partial trajectories, or the like.

In a preferred embodiment of the method according to the disclosure for operating an imaging locating device, the at least one trajectory is calculated by means of a traveling salesman algorithm from those (recommended) measurement positions $R_n'$, the addition of which into the locating process yields an optimized gain of locating-related map information items.

In this manner, the sequence of recommended measurement positions $R_n'$ to be selected can be calculated, preferably sorted, particularly preferably optimized, by a further optimization step in the method according to the disclosure. In particular, what can be achieved as a result thereof is that the at least one trajectory, which is interpretable as a connection of the measurement positions $R_n'$ to be selected in succession, advantageously has a particularly short, preferably minimal path length. Hence, it is possible to derive an instruction in the form of at least one trajectory which has been optimized in view of path length and which contributes to a particularly quickly and efficiently performable locating process.

Furthermore, the instruction output from the locating device to the user, in particular the at least one trajectory and the strategy included therein, which may be interpreted by the user, appears particularly intelligent.

In a preferred embodiment of the method according to the disclosure for operating an imaging locating device, the at least one trajectory is output in the form of a polyline displayed on a display apparatus and/or in the form of target points displayed on a display apparatus.

A display apparatus should be understood to mean an apparatus provided to output at least the at least one trajectory in the form of a polyline and/or in the form of target points. In this context, the display apparatus should, in particular, be understood to mean an apparatus which has a preferably planar, two-dimensional display element provided for a pictorial display or output of the at least one trajectory in the form of a polyline and/or in the form of target points. To this end, the display apparatus is connected to the evaluation apparatus and/or the control apparatus of the locating device for the purposes of transferring data. Here, the display apparatus may be connected to the evaluation apparatus and/or to the control apparatus by means of data cables or in a wireless manner. It is conceivable for the evaluation apparatus to be integrated into the display apparatus or for the display apparatus to be configured as a single part with components of the evaluation apparatus as well. The planar display element of the display apparatus may advantageously be realized as e.g. a liquid crystal display, an OLED display, an LED display, a screen provided for different suitable display technology, or as a projector. It is also conceivable for the display to be embodied with 3D capabilities and comprise means provided to convey a three-dimensional image impression to a user. Preferably, the display apparatus is provided for displaying grayscale values, particularly preferably for displaying colors. Hence, the at least one trajectory may preferably be output to a user of the locating device using color or grayscale encoding. By displaying and outputting the at least one trajectory to a user of the locating device by means of the display apparatus, it is possible to provide a particularly compact, flexible and immediately usable locating device.

In principle, it is also conceivable for the display apparatus to be embodied only separately from the locating device and be connected therewith via a wireless connection for the purposes of transferring output values, for example by way of a point-to-point connection, an ad-hoc connection, a WLAN connection, a Bluetooth connection or the like.

Preferably, the at least one trajectory displayed by the display apparatus is provided for interpretation by a human observer. In a preferred embodiment, the at least one trajectory is output in the form of a polyline and/or in the form of target points, with the polyline representing a connection of the (recommended) measurement positions $R_n'$ to be selected. The target points either only reproduce, on the display, the positions of the measurement positions $R_n'$ to be selected or they likewise display a connection between the measurement positions $R_n'$ to be selected, but merely reduced to an essential number of important and/or prominent target points, which serve for the orientation of the user and, in particular, for the transfer of the trajectory, output by means of the display apparatus, in relation to the examination surface. Preferably, the positions on the examination surface at which further recommended measurement positions need to be selected, in particular the directions as seen from the locating device in which said further recommended measurement positions need to be selected, by way of repositioning the locating device in order to carry out at least one locating process, which leads to an optimized gain of locating-related map information items, there can immediately be gathered from the at least one trajectory.

By way of example, the at least one trajectory, in particular the polyline and/or the target points, may e.g. be displayed true to scale in relation to the examination surface, in particular using an imaging scale. In this way, a particularly simple transfer of positions of the measurement positions to be selected to the workpiece is possible. In particular, illustrations which are true to scale and not true to scale may both be used for the output to a user of the locating device. Alternatively, or additionally, a display of the at least one trajectory, in particular of the polyline and/or the target points, which has been scaled dependent on the situation may be used.

Alternatively, or additionally, the at least one trajectory may also be output to a user of the locating device in individual partial trajectories, for example individual path portions which imply a repositioning of the locating device in a direction, said partial trajectories preferably being displayed in succession until the respectively next recommended measurement position to be selected is reached.

It should be noted that, in addition to the output of the at least one trajectory, the display apparatus, in particular the display element, may also be provided to output or display a map and further work parameters which are relevant, necessary and/or expedient for operating and controlling the locating device.

In a preferred embodiment of the method according to the disclosure for operating an imaging locating device, the at least one trajectory is output by coloring, and/or varying transparency of, an at least two-dimensional map information item displayed on a display apparatus as a map.

In particular, the display apparatus is provided to process an at least two-dimensional map information item, provided in the form of an in particular multidimensional matrix, table, array, list or the like, and display it as a map on a display unit, for example a display. Preferably, the display apparatus is provided here to display an at least two-dimensional map information item in the form of a color-coded or grayscale-encoded map. Here, the display apparatus is advantageously provided to convert locating information, in particular locating data, into a display attribute for pictorial reproduction, such as e.g. into a grayscale level, a grayscale value of a grayscale curve, a color value level, a color value of a color curve, a brightness level, a brightness value of a brightness curve, a saturation level or a saturation value of a saturation curve and/or a pattern and/or a symbol. Preferably, the display apparatus is provided to output a map as pictorial display of an at least two-dimensional map information item. In this context, a pictorial representation or display should be understood to mean, in particular, an optical reproduction of the locating data, preferably substantially true to scale and resolved in terms of position. Advantageously, the depicted map reproduces the examination surface in respect of the region of the examination surface examined by way of repositioning of the locating device. Preferably, the pictorial display is provided for interpretation by a human observer. In a preferred embodiment, the map is output as a two-dimensional image which represents an image of the locating conditions under the examination surface. It is preferably possible immediately to gather from the map the positions of the examination surface at which objects to be located are detected, i.e., in particular, the directions in which said object to be located are detected, as seen from the locating apparatus. In an exemplary embodiment, a displayed portion of the at least two-dimensional map information item may have an imaging scale which corresponds to a ratio of extents of the map information in the display element to extents in an associated region of the examination surface. The imaging scale advantageously has the same imaging scale for a first dimension and for a second dimension. The imaging scale is particularly preferably modifiable by a user of the locating device, and so a map information item depicted in the display element may be magnified or reduced and therefore zoomed. Furthermore, illustrations which are true to scale and not true to scale may both be used for the output to a user of the locating device.

Preferably, the display apparatus is provided, by way of a high processing rate and display rate, to lead a user of the locating device to believe that locating data for a region over which the locating device has passed are evaluated immediately, preferably in real time, and displayed as locating and/or map information. In particular, a display in real time means that the device-internal processing duration by the display apparatus up to the completed display of the locating information on the display element is less than 2 seconds, preferably less than 1 second, particularly preferably less than 0.5 seconds.

By using the map displayed by means of the display apparatus, the user of the locating device is able to generate and, at the same time, display an at least two-dimensional map information item by successively passing over the examination surface with the locating device. Hence, the user of the locating device obtains a map which is interpretable in an intuitive manner, from which locating information in relation to the examination surface may be gathered. With a successive measurement of an examination surface as a consequence of a repositioning of the locating device in relation to the examination surface, the user of the locating device obtains a clear, intuitively and easily interpretable, at least two-dimensional map.

According to the disclosure, the at least one trajectory is output to the user of the locating device by coloring and/or varying transparency of the map. In this manner, the trajectory can be displayed in a particularly intuitive and easily understandable manner.

In a preferred embodiment of the method according to the disclosure for operating an imaging locating device, the course of the at least one trajectory is output using directional indicators, in particular arrows.

Preferably, the directional indicators constitute simplified and intuitively understandable interpretation aids and/or display aids for the at least one trajectory, in particular the course thereof, which make it easier for a user of the locating device to find the next (recommended) measurement positions to be selected on the examination surface.

In a preferred embodiment, directional indicators in the form of arrows are output to the user of the locating device. In this way, there can be a particularly simple and, at the same time, a particularly intuitively understandable representation of the at least one trajectory. Preferably, the directional indicators, in particular the arrows, indicate the course of the at least one trajectory. Here, the directional indicators, in particular the arrows, may represent the course of the at least one trajectory up to the next measurement position to be selected, in the form of a directional prescription into which the locating device must be repositioned in order to reach the corresponding recommended measurement position along the shortest path. Hence, the arrows indicate a direction to be set for repositioning the locating device. Furthermore, provision can likewise be made to output a distance to the user, said distance representing the distance by which the locating device must be repositioned in the corresponding direction in order to arrive at the corresponding recommended measurement position.

Alternatively, or additionally, directional indicators may also be displayed and/or realized as different elements, in particular synthetic elements, for example in the form of lines, dashes, triangles, squares, rectangles, symbols or the like. By way of example, a rotational movement of the locating device to be carried out, or a recommended rotational movement thereof, may be reproduced by circles rotating in a corresponding direction.

Preferably, the directional indicators, in particular the arrows, may be displayed by means of the display apparatus. In particular, the directional indicators, in particular the arrows, may be output overlaid and/or superimposed on a map displayed by means of the display apparatus. Alternatively, or additionally, provision can be made for at least one signal output apparatus to output the directional indicators, in particular the arrows, to the user of the locating device. Here, a signal output apparatus should be understood to mean any output apparatus appearing expedient to a person skilled in the art, said output apparatus being provided to output the directional indicators, in particular the arrows, to the user in an optical, acoustic and/or tactile manner. By way of example, a signal output apparatus may be LED display elements which are arranged lying directly at the four edges of the locating device on the side facing a user when the locating device is used. By means of these LED display elements, it is possible, in particular, to output directional indicators by lighting up of a corresponding LED display element, said directional indicators signaling the direction in which the locating device needs to be repositioned in order to reach the corresponding measurement position.

Advantageously, there can be a particularly understandable display of the at least one trajectory, in particular of partial trajectories of the at least one trajectory, by the output of the course of the at least one trajectory using directional indicators, in particular arrows.

In one embodiment, it is possible for the reaching of the recommended measurement positions which are output using the directional indicators to be confirmed by the user, for example by pressing a button or as a result of the locating device being stationary. Alternatively, provision may be made for the locating device to automatically register the reaching of the recommended measurement positions which are output using the directional indicators, for example using the position data provided by the position sensor.

Reaching a recommended measurement position may be immediately followed by the output of a directional indicator which now represents the course of the at least one trajectory to the next recommended measurement position to be selected. To the extent that the user of the locating device successively repositions the locating device in the corresponding directions following the directional indicators, he advantageously follows the shortest path on which an optimized gain of locating-related map information items is to be expected.

It should be noted that, in one embodiment of the method according to the disclosure, the instruction, in particular the at least one trajectory, can also be output to the user in the form of a game, e.g. in the form of a game in which the user needs to follow specific game figures or flee from these (cf. Pac-Man), or in the form of a game whose object is to collect "goodies". In a method designed thus, the improvement of the display quality of displayed locating data may be brought about playfully and hence in a particularly entertaining and/or diverting manner.

Furthermore, an imaging locating device according to the disclosure is proposed, in particular a hand-held locating device, comprising at least
- a locating apparatus which is provided to detect locating data in relation to objects to be located which are concealed under an examination surface,
- a position sensor for detecting position data of the locating device in relation to the examination surface,
- an evaluation apparatus, which is provided to determine an at least two-dimensional map information item by assigning locating data to position data, wherein the evaluation apparatus is provided to calculate an instruction from locating data and/or position data and/or system parameters, in particular to calculate at least one trajectory, along which the locating device should be guided in order to obtain an optimized gain of locating-related map information items.

The locating device according to the disclosure, in particular the hand-held locating device, is provided to carry out the method according to the disclosure, in which, using the evaluation apparatus, an instruction for guiding the locating device is derived from locating data and/or from position data and/or from system parameters of the locating device in order to obtain an optimized gain of locating-related map information items.

A hand-held locating device should be understood to mean, in particular, that the locating device can be transported without the aid of a transport machine and by using only hands, in particular one hand. In particular, the locating device can be guided in a hand-held manner over the examination surface, even during a locating process with a movement freely carried out by a user of the locating device, in particular a movement carried out freely along two directions. Here, a free movement should be understood to mean, in particular, a movement which is independent of a predetermined grid or a predetermined track for the repositioning of the locating device, in particular for a movement or a travel of the locating device.

The locating device according to the disclosure preferably has a housing which receives at least the essential functional components of the locating device. In particular, the housing receives at least one control apparatus, the locating apparatus, the position sensor, the evaluation apparatus, an input and/or output apparatus, a display apparatus in particular, and also an energy supply apparatus. In particular, in terms of the overall volume thereof, more than 50%, preferably more than 75%, particularly preferably 100% of the components are housed in the housing of the locating device. Preferably, the hand-held locating device may have a handle or handle region, by means of which the locating device can be guided over the examination surface of the article to be examined. The mass of the hand-held locating device is less than 5 kg in particular, advantageously less than 3 kg and particularly advantageously less than 1 kg. In this way, it is possible to realize a particularly compact locating device in the form of a locating device that is easily guidable by a user in one hand. Furthermore, this allows the components of the locating device to be advantageously protected by the housing of the locating device against damage and ambient influences, for example against the ingress of moisture and dust.

The locating device furthermore comprises a control apparatus for actuating the functional components of the locating device, in particular for actuating at least the locating apparatus, the position sensor, the evaluation apparatus, preferably also an input apparatus and/or an output apparatus, a data communication interface, a memory apparatus and further components appearing expedient to a person skilled in the art. In particular, the control apparatus should be understood to mean an apparatus comprising at least one control electronics unit, which has means for communicating with the other components of the hand-held locating device. In particular, the control apparatus is provided to set at least one operating function parameter of the locating device in a manner dependent on at least one user input and/or an evaluation result from the evaluation apparatus. Advantageously, the control electronics unit of the control apparatus can be understood to mean a processor unit in conjunction with a memory unit and with an operating program stored in the memory unit, said operating program being run during the control process. In particular, the electronic components of the control apparatus may be arranged on a circuit board or printed circuit board, preferably in the form of a microcontroller. Particularly advantageously, the control apparatus may moreover be provided to control the whole locating device and facilitate the operation thereof.

An energy supply apparatus of the locating device is provided to supply the locating device with electrical energy, both for startup and during the operation. Preferably, this apparatus is a mains-independent energy store, in particular an accumulator, a battery, a fuel cell, a capacitor, another energy store appearing expedient to a person skilled in the art or a combination/plurality thereof. Preferably, accumulators with a cell chemistry providing a high power and/or energy density are particularly suitable for supplying the locating device with energy. Currently, these include e.g. accumulators with lithium and lithium ion cell chemistry, in particular lithium iron phosphate accumulators, lithium manganese oxide accumulators, lithium nickel cobalt manganese oxide accumulators, over-lithiated lithium nickel cobalt manganese oxide accumulators, lithium sulfur accumulators, lithium polymer accumulators and lithium oxygen accumulators. Preferably, the apparatus for energy supply has a detachable interlocking and/or force-fit connection interface. In this context, detachable should be understood to mean, in particular, separable in a non-destructive manner. Hence, the apparatus for energy supply is arrangeable on the locating device, preferably in a removable and interchangeable manner. Particularly preferably, the removable apparatus for energy supply can be resupplied and charged with energy from mains power when within and/or outside of the locating device. In an alternative, or additional, embodiment, the locating device, for the energy supply thereof, may also have a power cable.

In an advantageous embodiment of the locating device according to the disclosure, the locating device has an input apparatus for inputting work parameters and/or an output apparatus for outputting work parameters. Here, work parameters denote all necessary and/or expedient operational parameters of the locating device, in particular in relation to the control thereof, and parameters relating to the evaluation of the measurement results.

In particular, an input apparatus should be understood to mean a means provided to accept at least one information item from a user of the locating device and forward this to the control apparatus and/or the evaluation apparatus. By way of example, the input apparatus can be realized in the form of a user interface and/or using another device. Here, a user input may, in particular, be carried out by way of an acoustic, optical, gesture-assisted and/or tactile input. By way of example, the input apparatus may consist of an actuating element, a keyboard, a display, in particular a touch display, a speech input module, a gesture identification unit and/or a pointer device (e.g. a mouse). Furthermore, the input apparatus may additionally be present also outside of the locating device, in particular outside of the locating device, for example in the form of an external data device such as a smartphone, a tablet PC, a PC or any other external data device appearing expedient to a person skilled in the art which is connected to the control apparatus and/or the evaluation apparatus of the locating device by way of a data communication interface. The latter is advantageous, in particular, if the external data device permits and/or assists an extended functionality of the locating device, for example a specifically prepared input possibility or the like.

An output apparatus should be understood to mean at least one means provided to output at least one changing information item in an acoustic, optical and/or tactile manner to a user of the locating device, in particular the locating device. By way of example, this can be realized by means of a display, a touch display, a sound signal, a change in an operational parameter, a vibration transducer and/or an LED display. In a particularly preferred embodiment, the output apparatus can be realized as at least one display apparatus. Furthermore, information to be output, e.g. evaluation results and/or information relating to an operating state of the locating device, may also be output to a functional component of the locating device, in particular to the control apparatus, to a memory apparatus, to at least one locating apparatus, to the position sensor, to the evaluation apparatus and/or, particularly for increasing the user comfort, to a data processing system. The latter comprises at least also an output of an information item to an external device such as a smartphone, a tablet PC, a PC or any other external data device appearing expedient to a person skilled in the art, said external data device being connected to the evaluation apparatus and/or the control apparatus of the locating device by way of a data communication interface.

Both the input apparatus and the output apparatus may advantageously be housed directly in the housing of the locating device. Preferably, the input apparatus and/or the output apparatus is then arranged in a housing side facing the user of the locating device when the latter is used. In particular, a housing side means an outer wall of the housing delimiting the locating device from the surroundings thereof. Here, "arranged in a housing side" should be understood to mean that the input apparatus and/or the output apparatus is/are inserted, applied or fastened in any other way on the housing side in the surface thereof. In particular, the housing itself may also be part of the input or output apparatus. Alternatively, or additionally, the input and/or output apparatus may also be outsourced and, for example, realized by way of external apparatuses. The latter realization options explicitly comprise the control, evaluation and output of locating results by way of wired and/or wireless external systems such as e.g. remote controls, computer controls, tablet PCs and/or other mobile devices such as cellular telephones, smartphones etc.

In a preferred embodiment of the locating device according to the disclosure, the locating device has at least one first display apparatus, which is provided to display at least one instruction, in particular the at least one trajectory.

In a preferred embodiment of the locating device according to the disclosure, the locating device has at least one second display apparatus, which is provided to display at least the at least two-dimensional map information item as a map.

It should be noted that the first display apparatus and the second display apparatus may preferably also be configured as the same display apparatus.

In a preferred embodiment of the locating device according to the disclosure, the locating device has at least one signal output apparatus, which is provided to output directional indicators in an optical, acoustic and/or tactile manner.

Preferably, directional indicators may be output to the user of the locating device by means of a signal output apparatus. Here, a signal output apparatus should be understood to mean any output apparatus appearing expedient to a person skilled in the art, said output apparatus being provided to output the directional indicators, in particular the arrows, in an optical, acoustic and/or tactile manner to the user. By way of example, a signal output apparatus may refer to LED display elements and/or illuminated arrows and/or loudspeakers and/or a vibration transducer and/or a projection unit or the like. In a preferred embodiment of the locating device, the signal output apparatus can be realized as four LED display elements which are arranged lying immediately in the center of the four edges on the side of the locating device facing a user when the locating device is used. By means of these LED display elements it is possible, in particular, to output directional indicators by lighting up of a corresponding LED display element, said LED display elements signaling the direction in which the locating device needs to be repositioned in order to reach the corresponding measurement position.

Furthermore, in one advantageous embodiment of the locating device according to the disclosure, provision is made of at least one memory apparatus for storing measurement results, in particular locating results, and/or locating data and/or position data and/or at least two-dimensional map information items and/or work parameters. In particular, a memory apparatus should be understood to mean an electronic data memory comprising the means required for the actuation thereof. The memory apparatus is provided for storing and recalling measurement results and/or locating information and/or work parameters and/or other data required or expedient within the scope of operating the locating device. In particular, the memory apparatus is provided to store, at least temporarily, and/or recall locating data and/or evaluated locating information, preferably at least two-dimensional map information items. In principle, it is also conceivable for the memory apparatus to be provided for storing and recalling data components.

Preferably, the memory apparatus is embodied as a memory which is writable and readable by the evaluation apparatus and/or the control apparatus. The memory apparatus may comprise all forms of external and internal electronic memories, in particular digital memories, for example a RAM component or integrated circuits. Alternatively, or additionally, the memory apparatus may, in particular, also be provided for writing and reading changeable storage media such as memory chips, USB sticks, memory sticks, memory cards, SD cards or the like. In a preferred configuration, the memory apparatus may be integrated into the evaluation apparatus and/or into the control apparatus and/or into the input apparatus and/or into the output apparatus and/or into a data communication interface, i.e., for example, embodied as part of a memory of the evaluation apparatus.

In an advantageous embodiment of the locating device according to the disclosure, provision is made of a data communication interface for, in particular, wireless communication, by means of which the locating device can interchange data, in particular transmit and/or receive measurement results, in particular locating results, and/or locating data and/or position data and/or at least two-dimensional map information items and/or work parameters. In terms of signaling, the data communication interface is connected to at least the control apparatus and/or the evaluation apparatus of the locating device. Preferably, the data communication interface uses a standardized communication protocol for transmitting electronic, in particular digital data. Advantageously, the data communication interface comprises a wireless interface, in particular e.g. a WLAN, Bluetooth, infrared, NFC, RFID interface or any other wireless interface appearing expedient to a person skilled in the art. Alternatively, or additionally, the data communication interface may also have an adapter for a wired data transfer, e.g. a USB or micro USB adapter.

Advantageously, measurement results, in particular locating results, and/or locating data and/or position data and/or at least two-dimensional map information items and/or work parameters may, by way of the data communication interface, be transmitted to, or received by, an external data device, for example to a smartphone, a tablet PC, a PC, a printer or further external devices appearing expedient to a person skilled in the art. By means of the configuration according to the disclosure, it is advantageously possible to facilitate a transfer of data which is usable for further evaluation of measurement signals and/or at least two-dimensional map information items detected by the locating device. Furthermore, multifaceted additional functions may advantageously be facilitated and included, which additional functions, in particular, also require direct communication with smartphones (in particular by way of programmed apps) or similar portable data devices. By way of example, these may comprise automatic evaluation functions, firmware updates, data postprocessing, data preparation, data reconciliation with other devices, or the like.

BRIEF DESCRIPTION OF THE DRAWINGS

The disclosure is explained in more detail in the following description on the basis of exemplary embodiments depicted in the drawings. The drawing and the description contain several features in combination. Expediently, a person skilled in the art will also consider the features on their own and combine them to form expedient further combinations. The same reference signs in the figures denote the same elements.

In detail.

DETAILED DESCRIPTION

Figure 1:
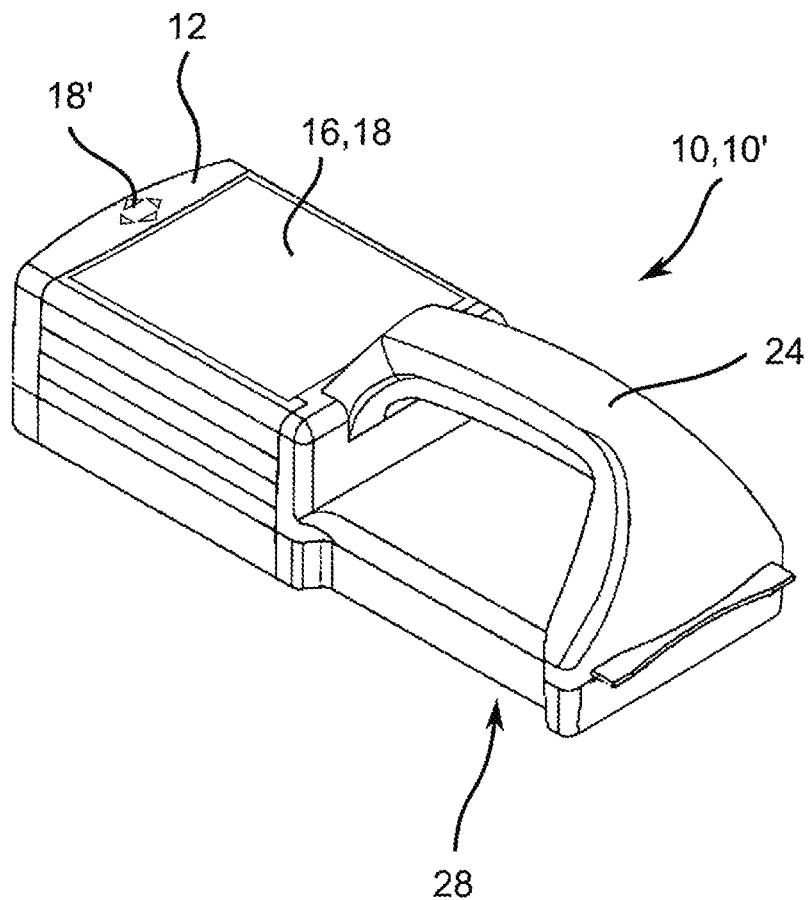
FIG. 1 shows a perspective side view of a configuration of a locating device according to the disclosure.
Figure 2:
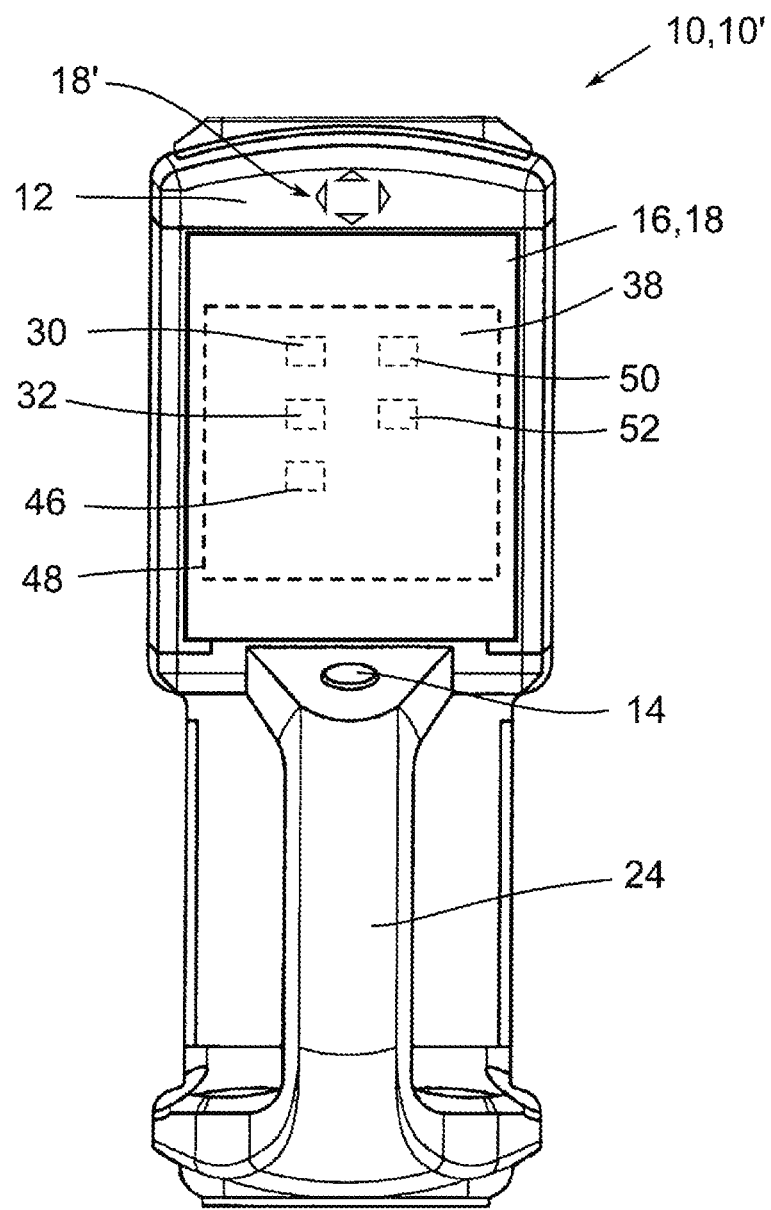
FIG. 2 shows a top view of the same configuration of the locating device according to the disclosure.
Figure 3:
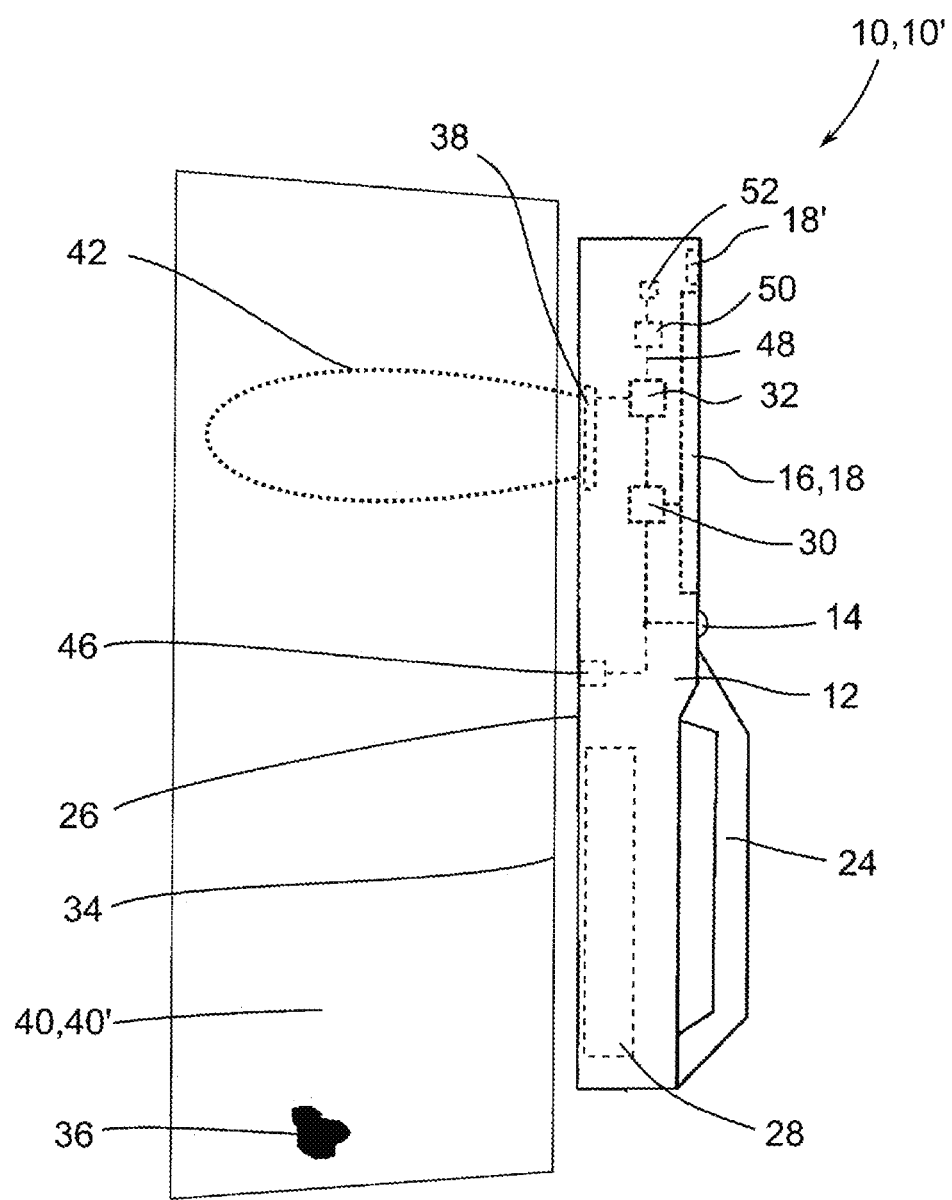
FIG. 3 shows a schematic side view of a configuration of a locating device according to the disclosure.

FIG. 1 and FIG. 2 show two views of an exemplary embodiment of an imaging locating device 10 according to the disclosure in a perspective illustration and in a simplified schematic plan view. In FIG. 3, the embodiment of the locating device 10 according to the disclosure is depicted in a simplified schematic side view. The depicted locating device 10 is realized as a hand-held locating device 10'. The locating device 10 with the exemplary configuration has a housing 12, an input apparatus in the form of actuating elements 14, suitable for switching the locating device 10 on and off, and a touch-sensitive display element 16 for starting and configuring a measurement process and for entering operational parameters. The touch-sensitive display element 16 is part of a display apparatus 18 which furthermore serves to display and output work parameters and/or evaluation results, in particular an at least two-dimensional map information item 20 in the form of a map 22, in particular in the form of an at least two-dimensional map 22 (cf., in particular, FIG. 5).

For transportation purposes and for the guidance thereof, the locating device 10 has a handle 24. The handle 24, the actuating elements 14 and the display element 16 are situated on one housing side of the locating device 10 which typically faces the user when operating the locating device 10.

For the purposes of supplying the locating device 10 with energy, the locating device 10 has a recess on the device rear side 26, i.e. the device side lying opposite the device side receiving the display element 16 on the rear side, said recess being provided for receiving at least one power-mains-independent energy store 28, in particular batteries or rechargeable accumulators. The locating device 10 presented in an exemplary manner comprises lithium ion accumulators, the high energy and power density of which is advantageously suitable for supplying the locating device 10 with energy. In an alternative embodiment, the energy store 28 may also be housed in the handle 24 of the locating device 10. Preferably, the energy store 28 has a detachable interlocking and/or force-fit connection interface such that the at least one energy store 28 is arrangeable in or on the locating device 10 in a removable and replaceable manner. Moreover, the energy store 28 can be supplied and charged with power from mains power when within and/or outside of the locating device 10.

The input apparatus, consisting of actuating elements 14 and the touch-sensitive display element 16, serves to input work parameters required and/or expedient for the operation of the locating device 10 by way of a user of the locating device 10. The components of the input apparatus are connected to an evaluation apparatus 30 and/or a control apparatus 32 for transferring user inputs. The evaluation apparatus 30 and/or the control apparatus 32 is/are provided to evaluate the user inputs and, in particular, adapt parameters for controlling the locating device 10 and/or for generating and modifying a locating-related information item, in particular an at least two-dimensional map information item 20. By way of example, a user input allows the locating device 10 and/or a locating process to be started, a color scale and/or an imaging scale of a map 22 displayed by means of the display apparatus 18 to be adapted, an at least two-dimensional map information item 20, which is depicted by means of the display apparatus 18 in the form of a map 22, to be modified, or the like.

The display apparatus 18 is provided to display a locating information item, in particular to display, preferably display true to scale, at least one portion of a two-dimensional map information item 20 as a map 22. In principle, the display apparatus 18 is also provided to display an entire two-dimensional map 22 in one operating state. The display apparatus 18 is linked to the evaluation apparatus 30 for transferring at least one two-dimensional map information item 20 and for transferring an instruction to be output to a user of the locating device 10. In particular, the at least two-dimensional map information item 20 is provided in the form of multidimensional matrices or the like by the evaluation apparatus 30 and adapted and/or converted by the display apparatus 18 for display in the form of a map 22 or at least in the form of a portion of a map 22. The display apparatus 18 is provided to convert the at least two-dimensional map information items 20 into a display attribute for pictorial reproduction, such as e.g. a grayscale value level, a grayscale value of a grayscale value curve, a color value level, a color value of a color curve, a brightness level, a brightness value of a brightness curve, a saturation level or a saturation value of a saturation curve and/or a pattern and/or a symbol. The display apparatus 18 has a display element 16 for displaying the map 22 and an instruction, in particular a trajectory 33. In the present exemplary embodiment, the display element 16 is embodied as a color-capable OLED display. The display apparatus 18, in particular the display element 16, is embodied as part of the locating device 10 and integrated into the housing 12 of the locating device 10. In principle, it is also conceivable for the display apparatus 18, in particular the display element 16, to be embodied separately from the locating device 10 and to be connected thereto by way of a wireless connection for transferring output values and an instruction, for example by way of a point-to-point ad-hoc connection, a WLAN connection, a Bluetooth connection or the like.

Furthermore, the locating device 10 has a signal output apparatus 18' which is embodied separately from the display element 16 of the display apparatus 18. The signal output apparatus 18' comprises four LED display elements in the form of an arrow tip which are arranged directly next to, in particular above, the display element 16 on the side of the locating device 10 facing a user when the locating device 10 is used. By means of these LED display elements of the signal output apparatus 18', it is possible to output, in particular, directional indicators 54 by lighting up one or more corresponding LED display elements, which signal the direction in which the locating device 10 needs to be repositioned in order to reach a measurement position 44 recommended by the locating device 10. In an alternative, or additional, exemplary embodiment, the signal output apparatus 18' may also be provided to output directional indicators 54 in an acoustic and/or tactile manner.

Advantageously, an instruction for guiding the locating device 10 may be displayed by means of the display apparatus 18 of the locating device 10. In one preferred exemplary embodiment, the instruction is realized in the form of at least one trajectory 33 which is displayed by means of the display apparatus 18, in particular the display element 16 (cf., in particular, FIGS. 5d, 5f). To this end, the display apparatus 18 can overlay the at least one trajectory 33 and an at least two-dimensional map information item 20 to be displayed, in particular the representation thereof as a map 22, in such a way that both the at least one trajectory 33 and the at least two-dimensional map information item 20, in particular the map 22, are displayed simultaneously and output to the user of the locating device 10 (cf., in particular, FIGS. 5d, 5f). The portion of the map 22 displayed by the display apparatus 18, in particular by the display element 16, has an imaging scale which corresponds to a ratio of extents of the map 22 in the display element 16 to extents of an associated region of an examination surface 34 (cf., in particular, FIG. 3 and FIGS. 5b, 5d, 5f, 5h). The imaging scale has an equal imaging scale for a first direction and for a second direction which, in particular, is orthogonal to the first direction. In particular, the display of the at least two-dimensional map 22 and the at least one trajectory 33 is independent of the orientation of the locating device 10 on the examination surface 34. Hence, the depicted map 22 represents objects 36 to be located which are located under the examination surface 34 in a manner true to the position thereof, independently of the orientation of the locating device 10. Preferably, the depicted map 22 and the at least one trajectory 33 are rotated against the direction of the rotational movement in the case of a rotation of the locating device 10 such that the depicted map 22 and the at least one trajectory 33 reproduce the objects 36 to be located which are located under the examination surface 34 in a manner true to the position thereof, even when the locating device 10 is rotated.

The display apparatus 18 is furthermore provided for the output or display of further necessary, useful and/or expedient information items, for example for outputting a locating direction, a locating accuracy, conventional operating instructions, an operational menu or the like. The display apparatus 18 furthermore renders it possible to depict an at least two-dimensional map information item 20 as a map 22 having synthetic elements. By way of example, in addition to the trajectory 33, such synthetic elements furthermore represent lines, boxes, other geometric forms, patterns, symbols or the like.

The locating device 10 has a locating apparatus 38, with the locating apparatus 38 being provided to detect locating data in respect of objects 36 to be located which are concealed under an examination surface 34. The locating apparatus 38 is housed in the housing 12 of the locating device 10 such that the locating apparatus 38 is held and protected by the housing 12 in an assembled state of the locating device 10. In the shown exemplary embodiment, the locating apparatus 38 is embodied as a transmission and reception unit for electromagnetic radiation, in particular as an LCR antenna (not depicted in any more detail). The LCR antenna is provided for emitting electromagnetic radiation on the device rear side 26 facing away from a user of the locating device 10. To this end, the locating apparatus 38 comprises at least one antenna element (not depicted in any more detail here) and an antenna controller (likewise not depicted in any more detail here) for actuating the LCR antenna. As depicted in the schematic section in FIG. 3, the locating apparatus 38, in particular the LCR antenna, emits electromagnetic signals which penetrate into the workpiece 40 to be examined from the device rear side 26, which signals are depicted in the form of a first detection region 42 (reception lobe). Signals reflected and/or scattered in the interior of the workpiece 40, in particular electromagnetic radiation at least partly reflected by an object 36 to be located which is concealed under the examination surface 34, are detected by means of the antenna of the locating apparatus 38. Here, electromagnetic properties of the volume arranged below the examination surface 34 are detected, at least in the detection region 42 of the locating apparatus 38. Electromagnetic properties detected by means of the reflected electromagnetic radiation relate, in particular, to an electric or magnetic conductivity or an electric or magnetic susceptibility of the objects 36 to be located which are concealed under the examination surface 34. The locating apparatus 38 is arranged directly behind the housing side in the interior of the housing 12 which faces away from the user when applying the locating device 10. In this manner, the locating apparatus 38 can be positioned advantageously close to the examination surface 34 when applying the locating device 10, in particular when placing the locating device 10 onto an examination surface 34 to be examined. By emitting and receiving a locating signal of the locating apparatus 38, the locating apparatus 38 determines locating data relating to the existence and lateral position of the object 36 to be located, preferably also relating to a distance between the LCR antenna and an object 36 to be located. From these locating data, it is possible to determine, by way of the evaluation apparatus 30, the at least two-dimensional map information item 20 (cf., in particular, FIGS. 5b, 5d, 5f, 5h) as a consequence of an assignment of locating data to position data of the locating device 10 in relation to the examination surface 34. By way of example, it is possible to locate objects to be located, such as reinforcing rods, metallic inclusions or the like, in a workpiece 40 to be examined, in particular a wall 40' to be examined, by using the locating apparatus 38.

It should be noted that the disclosure is not restricted to the use of an LCR antenna. In principle, the locating device 10 for locating the objects 36 to be located which are concealed under an examination surface 34 may also be realized with different locating apparatuses 38, in particular locating apparatuses based on different measurement methods, e.g. a locating apparatus 38 having an inductive sensor, a capacitive sensor, a microwave sensor, a terahertz sensor, an ultrahigh frequency sensor, an x-ray sensor, an infrared sensor, an NMR sensor or the like.

The locating device 10 moreover comprises a position sensor 46, which is provided to detect position data of the locating device 10 in relation to the examination surface 34. In an assembled state of the locating device 10, the position sensor 46 is received in the housing wall on the device rear side 26. The position sensor 46 allows the locating device 10 to detect a change in alignment and/or change in position of the locating device 10 in relation to the examination surface 34 of a workpiece 40 to be examined (cf., in particular, FIG. 3). In particular, the position sensor 46 detects a movement of the locating device 10 and a traveled distance and/or direction and therefore renders it possible to relate locating data to a position of the locating device 10, in particular to the examination surface 34. In particular, the position sensor 46 moreover renders it possible to detect a rotation of the locating device 10 about an axis which extends perpendicular in relation to the examination surface 34. In the depicted exemplary embodiment, the position sensor is embodied as an optical displacement transducer which is arranged in the housing wall of the device rear side 26 facing the workpiece 40 to be examined when the locating device 10 is applied.

As depicted in FIG. 3, the locating device 10 is positioned with the device rear side 26 in the direct vicinity of the examination surface 34, in particular in contact with the examination surface 34, in a planar fashion in order to locate an object 36 to be located which is concealed under an examination surface 34. Here, the locating device 10 is provided to be guided on and/or over the examination surface 34 by hand. Here, the locating device 10 is positioned with the device rear side 26 in the direct vicinity of the examination surface to be examined, in such a way that the distance between the device rear side 26 and the examination surface 34 is minimized. What this achieves is that the detection region 42 of the locating apparatus 38 may penetrate into the workpiece 40 to be examined. A change in position of the locating device 10 is detected as a consequence of repositioning, in particular displacing or shifting, of the locating device 10 on the workpiece 40. Corresponding position data are forwarded to the evaluation apparatus 30 for further evaluation. Particularly advantageously, a multidimensional, in particular at least two-dimensional, map information item 20 and/or a pictorial representation of the at least two-dimensional map information item 20 may be generated in the form of a map 22 by means of a position-dependent measurement and evaluation of an examination surface 34.

Further components of the locating device 10, in particular the locating apparatus 38, the control apparatus 32, the evaluation apparatus 30, and also a data communication interface 50 connected to the control apparatus 32 and/or the evaluation apparatus 30 and a memory apparatus 52, are housed on a carrier element 48 of the locating device 10, in particular a system circuit board or printed circuit board within the housing 12 (see, in particular, FIG. 2 and FIG. 3).

The control apparatus 32 has a control electronics unit comprising means for communicating with the other components of the locating device 10, for example means for open-loop and/or closed-loop control of the locating apparatus 38, and means for controlling the locating device 10. In particular, the control apparatus 32 comprises a unit (not depicted in any more detail) comprising a processor unit, a memory unit and an operating program stored in the memory unit.

The evaluation apparatus 30 is connected to the locating apparatus 38 for transmitting locating data and connected to the position sensor 46 for transmitting position data. The evaluation apparatus 30 has at least one processor and a memory (not depicted in any more detail) with an operating program which is stored thereon and executable. Furthermore, the evaluation apparatus 30 has a signaling connection with the data communication interface 50 and the display apparatus 18, in particular the display element 16. The evaluation apparatus 30 is provided to determine an at least two-dimensional map information item 20 by assigning locating data of the locating apparatus 38 to position data of the position sensor 46. The at least two-dimensional map information item 20 relates to at least one position-resolved information item about the existence of objects to be located under an examination surface 34 (cf., in particular, FIGS. 5b, 5d, 5f, 5h). The evaluation apparatus 30 furthermore has evaluation routines for preparing and/or analyzing locating data and/or position data, in particular closed-loop control routines, open-loop control routines, analysis routines, calculation routines, assignment routines, conversion routines, statistical evaluation routines, filters or the like. In particular, the evaluation apparatus is provided to establish locating data by means of interpolation or extrapolation routines for some of the regions of a two-dimensional map information item, for which (up until now) no locating data are available by way of the locating process. To this end, for the purposes of calculating interpolated or extrapolated locating data for the region without locating data, use is preferably made of locating data of regions of the at least two-dimensional map information item which are in the surroundings of the region without locating data. Evaluation results, in particular an at least two-dimensional map information item 20, derived from the locating data and the position data, and at least one instruction are output by the evaluation apparatus 30 for further processing by the control apparatus 32, either output to the memory apparatus 52 or, for the purposes of transmitting the data, to the data communication interface 50 or directly to a user of the locating device 10. Here, an output to a user is brought about by means of the display apparatus 18, i.e. for example by displaying the at least two-dimensional map information item 20 in the form of a map 22 on the display element 16. The output on the display element 16 is preferably carried out graphically, numerically and/or alphanumerically, for example in the form of a measurement value, a measurement curve, a signal curve, a time curve, as image data, in a gradient display, by means of symbols and in a combination thereof.

Moreover, the evaluation apparatus 30 has at least mathematical routines which find use within the scope of a mathematical optimization calculation, preferably e.g. numerical algorithms, functions or the like.

By way of a high processing rate or display rate, the evaluation apparatus 30 and the display apparatus 18 are provided to lead a user of the locating device 10 to believe that locating data for a region traveled over by the locating device 10 are evaluated immediately, preferably in real time, and provided as map information or depicted as map 22. To this end, the device-internal processing duration by the evaluation apparatus 30 and the display apparatus 18 is less than 2 seconds, preferably less than 1 second, particularly preferably less than 0.5 seconds.

The evaluation apparatus 30 is provided for carrying out a method according to the disclosure described below, in which an instruction for guiding the locating device 10 is derived from locating data established by means of the locating apparatus 38 of the locating device 10 and/or from position data established by means of the position sensor 46 of the locating device 10 and/or from system parameters of the locating device 10 in order to obtain an optimized gain of locating-related map information items 20. Preferably, the instruction is a trajectory 33, along which the locating device 10 should be guided in order to obtain an optimized gain of locating-related map information items 20.

Figure 4:
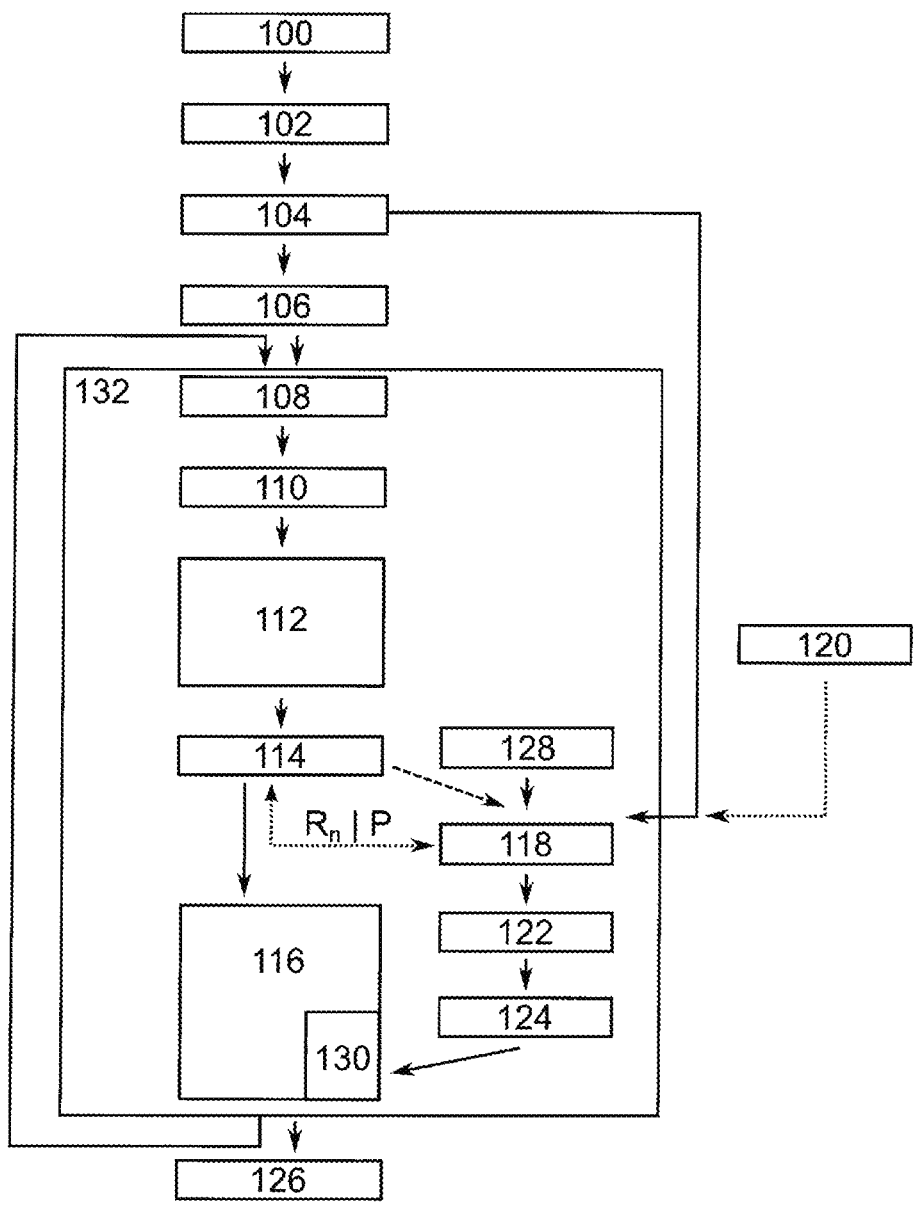
FIG. 4 shows a schematic illustration of an embodiment of a method according to the disclosure in a flowchart.

Below, the functionality, the operation and the method according to the disclosure are explained in an exemplary embodiment on the basis of the exemplary measurement scenario depicted in FIG. 5 and a flowchart for operating the locating device 10 depicted in FIG. 4. Reference is made to the fact that the method according to the disclosure, in which an instruction for guiding the locating device 10 is derived by the evaluation apparatus 30 from locating data established by means of the locating apparatus 38 of the locating device 10 and/or from position data established by means of the position sensor 46 of the locating device 10 and/or from system parameters of the locating device 10, may also be restricted to a few of the method steps of the method, described below, underlying the operation of the locating device 10.

Figure 5:
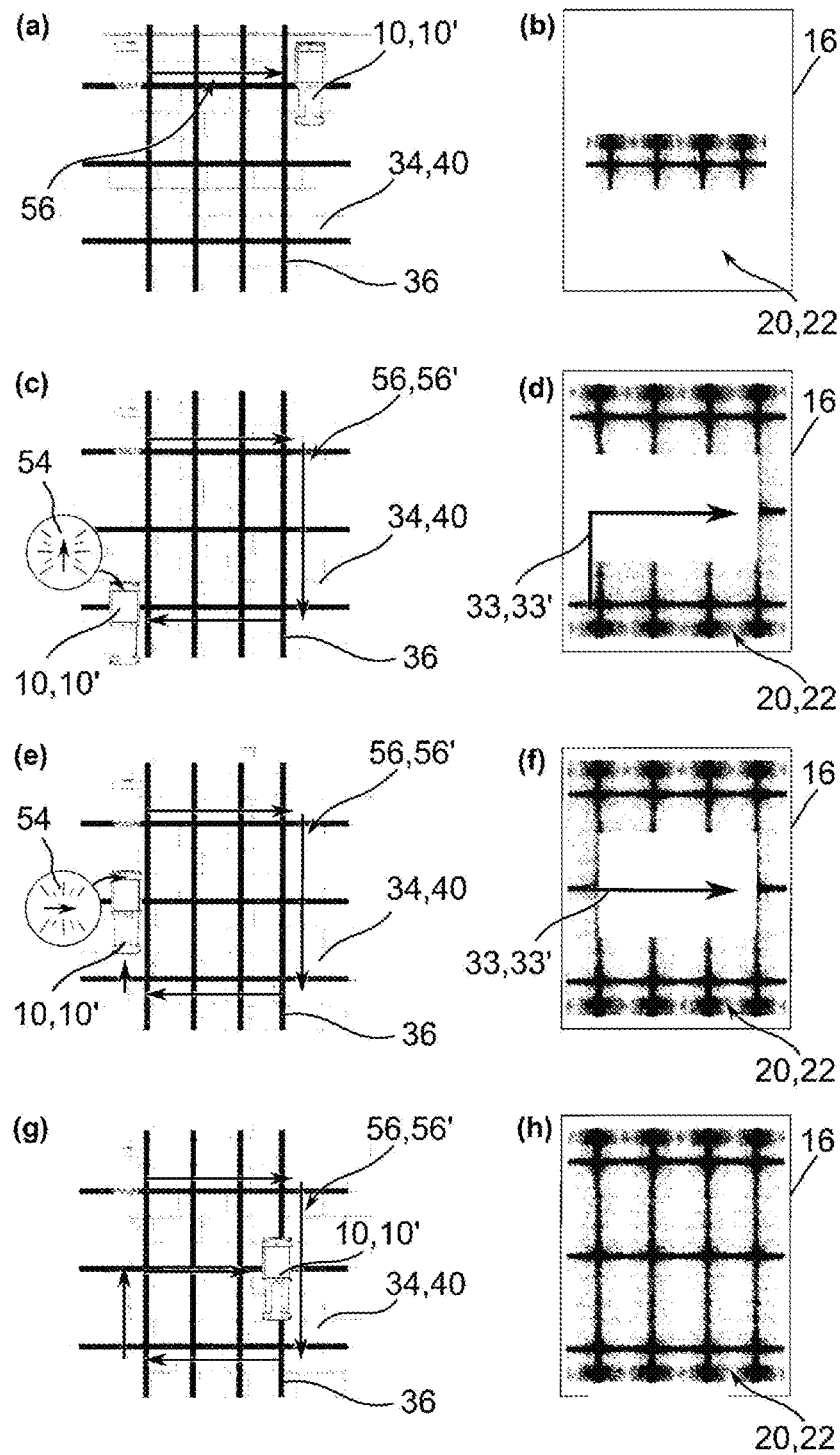
FIG. 5 shows a schematic illustration of an embodiment of the locating device during the application thereof at an article to be examined.

The description is based on the scenario, depicted in FIG. 5, of a user of the locating device 10 wishing to examine a building wall 40' as a workpiece 40 in respect of concealed objects 36 to be located, in particular e.g. reinforcements, pipes, electrical lines or the like. When the locating device 10 is switched on by means of an actuating element 14, the locating device 10 initially carries out a calibration of the functional components of the locating device 10 (method step 100). The calibration serves for the startup of the functional components of the locating device 10, inter alia for the readout of the internal memory apparatus 52, the loading of operating routines, and the initialization of the locating apparatus 38, the evaluation apparatus 30 and the position sensor 46. During this startup, the locating device 10 is preferably freely in the air in the hand of the user, i.e., in particular, it does not have contact with an examination surface 34. Subsequently, the locating device 10 is ready for use and in a standby mode. With the device rear side 26 provided to this end, the user of the locating device 10 places the locating device 10 onto the examination surface 34 of the wall 40' to be examined at any position. In the process, the user of the locating device 10 pushes slightly against the wall 40' in such a way that inadvertent slipping and/or shaking of the locating device 10 on the wall 40' is avoided. The locating device is placed in method step 102.

Subsequently, the locating device 10 selects a target function underlying the method according to the disclosure being carried out; optionally, this is also performed by the user of the locating device 10 by means of a manual input. During the subsequent method, the instruction for guiding the locating device 10 is calculated and derived using this target function within the scope of a mathematical optimization. In particular, the target function to be optimized may be selected differently and/or defined differently in the method according to the disclosure. In one exemplary embodiment, the locating device 10, in particular the evaluation apparatus 30 thereof, or, optionally, the user of the locating device 10 may select the target function in such a way that it is defined taking account of at least one of the following parameters, said parameter, in particular, relating to:

- a distribution of the position data of the locating device 10;
- a signal-to-noise ratio of the locating data at different positions of the locating device 10 in relation to the examination surface 34;
- a priori knowledge about properties of employed evaluation and/or interpolation algorithms;
- a deviation in the correlation of adjacent locating data;

knowledge obtained a priori and/or during the locating process about probabilities of deviations between an expected position and an actual position of the locating device 10 in relation to the examination surface 34.

The target function underlying the optimization method is selected in method step 104. This selection can be changed at any time by the locating device 10, in particular by the evaluation apparatus 30 thereof, and optionally also by the user of the locating device 10. This is indicated by method step 120. By way of example, the target function may be changed if a calculated instruction is considered to be impractical and/or inaccurate when using a selected target function. Subsequently, the user confirms the start of a locating process by means of an actuating element 14, as a consequence of which the locating apparatuses 38 and the position sensor 46 are put into operation. From now on, the locating device 10 is operational and in an idle mode (method step 106).

From now on, the user is able to displace the locating device 10 over the examination surface 34 (method step 108), with a repositioning of the locating device 10 being detected by the position sensor 46 (method step 110) and position data being output to the evaluation apparatus 30. At the same time, the locating apparatus 38 carries out a locating process in the detection region 42 thereof (method step 112), with locating data, which are subsequently forwarded to the evaluation apparatus 30, being established. The locating data are processed further by the evaluation apparatus 30 in method step 114, i.e. there is at least one determination of an at least two-dimensional map information item 20 by assigning locating data of the locating apparatus 38 to position data of the position sensor 46. Furthermore, the further processing may also comprise a preparation and/or analysis of locating data, in particular by means of closed-loop control routines, open-loop control routines, analysis routines, calculation routines, assignment routines, conversion routines, statistical evaluation routines, filters and the like. Preferably, the evaluation apparatus carries out an interpolation of already available locating data in method step 114. The at least two-dimensional map information item 20 determined thus is subsequently forwarded to the display apparatus 18, by means of which it is prepared for display by means of the display element 16 in the form of a map 22 and subsequently output to the user of the locating device 10 (method step 116).

Thus, after placing the locating device 10 onto the examination surface 34, the user can move, in particular shift or displace, the locating device 10 along the examination surface 34 during operation. This is indicated schematically in FIGS. 5a, 5c, 5e, 5g by arrows which indicate a path 56 of repositioning of the locating device 10. In the embodiment depicted in FIG. 5c, this path 56 may correspond to successive partial paths 56' aligned perpendicular to one another. In relation to a wall 40' to be examined, these partial paths 56' may extend e.g. horizontally and vertically. In a preferred, user-friendly and particularly intuitive embodiment, the locating device 10 may also be moved freely over the examination surface 34 (not depicted in any more detail here). Particularly advantageously, a movement along a predetermined, in particular rigid, path is not necessary in this embodiment. Hence, the user may guide the locating device 10 over the examination surface 34 in a freely executable wiping movement and examine the examination surface 34 in a simple and intuitive manner. The free wiping movement of the locating device 10 then results in a free path 56, in particular with an arbitrary configuration, which is independent of a predetermined grid or a predetermined track for the movement or the displacement path. As a consequence of the repositioning, in particular displacing or shifting, of the locating device 10 on the examination surface 34, a change in position of the locating device 10 is forwarded in the form of position data to the evaluation apparatus 30 for further evaluation. By means of a position-dependent measurement and evaluation of locating data, it is possible to successively generate an at least two-dimensional map information item 20, as depicted schematically in FIGS. 5b, 5d, 5f, 5h. Preferably, the at least two-dimensional map information item 20 in the form of a map 22 is generated and displayed in real time, i.e. successively in accordance with the repositioning of the locating device 10 in relation to the examination surface 34 (cf., for example, the change in the map between FIG. 5b and FIG. 5h). The display apparatus 18 is provided to vary the displayed portion of the map and hence the displayed map information item 20 in relation to the examination surface 34 in a manner dependent on position data of the locating device 10. Furthermore, the display apparatus 18 is provided to scale the displayed portion of the map 22, in particular to scale this in a manner dependent on the position data.

The evaluation apparatus 30 starts with the generation of the target function to be optimized at a specific time—either initiated by a user input (represented by method step 128) or initiated by the locating device 10, in particular the evaluation apparatus 30 thereof (represented by the dashed arrow between method steps 114 and 118). To this end, the evaluation apparatus 30 resorts, in method step 118, to already available locating data and/or position data, i.e. locating data and/or position data established at measurement positions $R_n$, and/or system parameters P (depicted by the dashed arrow denoted "$R_n|P$"), in accordance with the target function selected in method step 104 and/or 120 (cf., in particular, FIGS. 6 and 7). The target function equipped with boundary conditions (constraints) and values, in particular already available locating data and/or position data, is optimized in method step 122. The solution to the optimization problem supplies those recommended measurement positions $R_n'$, the addition of which yields an optimized gain of locating-related map information items 20 in a locating process. Subsequently, a trajectory 33 optimized in respect of a path length is calculated from the recommended measurement positions $R_n'$, established by optimizing the target function, by applying a traveling salesman algorithm in method step 124, said trajectory, in particular, being defined by a sequence of measurement positions $R_n'$ to be selected. This trajectory 33 constitutes an instruction for guiding the locating device 10 to obtain an optimized gain of locating-related map information items 20, provided said instruction is followed. Hence, a locating process which can be carried out particularly quickly and efficiently may be realized in a situation-dependent manner.

The trajectory 33 is subsequently overlaid with the map 22 output to the user of the locating device 10 by means of the display apparatus 18 in method step 116 such that, from now on, both the map 22 and the trajectory 33 are visible on the display element 16 (method step 130). In the much simplified measurement scenario depicted in FIG. 5, a user of the locating device 10 has initially passed over a path 56 with a U-shape when repositioning the locating device 10 (cf. FIGS. 5a and 5c). The map 22 generated in the process likewise displays the locating data in the form of a U-shaped at least two-dimensional map information item 20, cf. associated FIGS. 5b and 5d. As a consequence of carrying out the method according to the disclosure, a trajectory 33 in the form of a polyline 33' displayed on the map 22 is output to the map 22 depicted in FIG. 5d. The displayed trajectory 33 changes over the further course of the locating process in accordance with a repositioning of the locating device 10 (cf., in particular, the different form of the trajectory 33 in FIG. 5d and FIG. 5f). Furthermore, there is, at the same time, an output of the instruction by means of directional indicators 54, which are displayed using the signal output apparatus 18', i.e. using the four LED display elements (cf. FIGS. 5c and 5e, reference sign 54) of the locating device (cf. FIGS. 1 to 3). In this way, it is possible to output the course of the trajectory 33 particularly intuitively to the user of the locating device 10. If the user follows the trajectory 33, the at least two-dimensional map information item 20, in particular the map 22, is enhanced, in particular completed, by an optimized gain of locating-related map information items 20. Advantageously, the gain of locating-related map information items 20 occurs on an optimized path—which corresponds to the trajectory 33—such that a locating process which is able to be carried out particularly quickly and efficiently is realized in a situation-dependent manner. Advantageously, in the depicted exemplary embodiment, no portions of the path 56 were passed over twice by repositioning the locating device 10 before the complete display of the map 22.

The method steps combined in the box (corresponding to reference sign 132 and the arrow indicating repetition) as locating process, in particular method steps 108 to 130 (excluding 120), are run through repeatedly such that, in the case of successively repositioning the locating device 10 in relation to the examination surface 34, a successively assembling map 22 is output. It should be noted that the method according to the disclosure—in particular method steps 104, 118, 120, 122, 124, 128—may likewise be carried out repeatedly, in particular initiated by the user (particularly in method step 128) and/or when a necessity is identified by the locating device 10 itself (dashed arrow between method step 114 and method step 118). By way of example, such a necessity is present if an update of the instruction appears necessary and/or expedient. Alternatively, such a necessity is present for example if no sensible instruction can be derived by means of the target function selected in method step 104 or 120 such that a (renewed) determination using a differently defined target function is necessary and/or expedient.

The locating process can be terminated in method step 126 by an input of the user, in particular by switching off the locating device 10.

In a preferred embodiment of the method according to the disclosure, the target function is defined as a sum of deviations of distance variables from an average distance variable, wherein a distance variable is calculated for each grid point of at least a subset of all grid points as an average distance of the grid point from N nearest measurement positions $R_n$ and the average distance variable is calculated as the average value of the distance variables.

Figure 6:
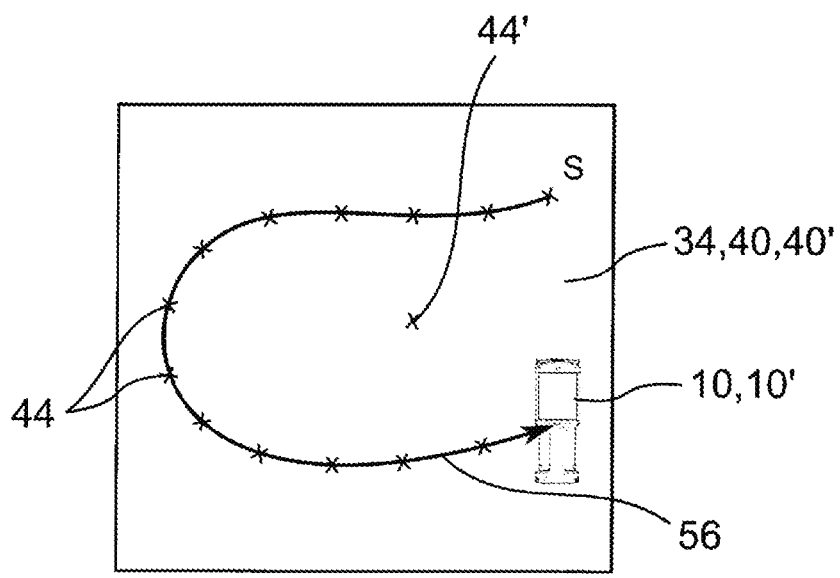
FIG. 6 shows a schematic visualization for an embodiment of the target function.
Figure 6:
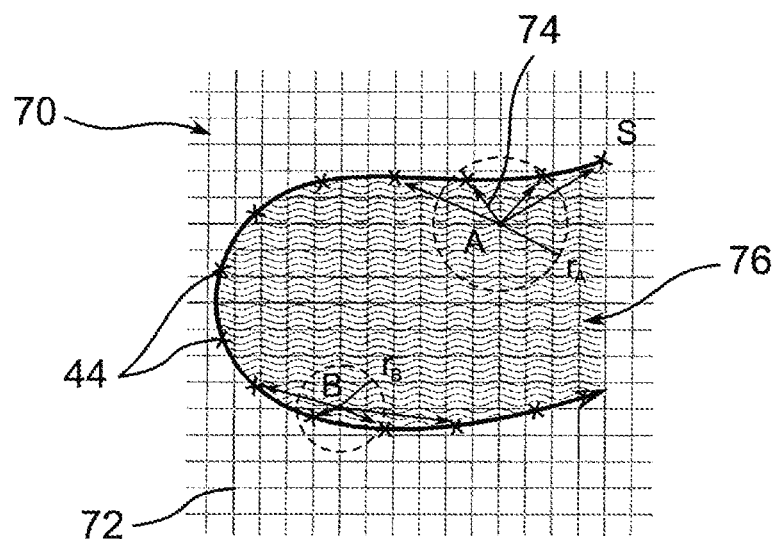

A simplified, schematic illustration for visualizing these relations is provided in FIG. 6. FIG. 6a depicts a workpiece 40 to be examined, for example a wall 40'. As a consequence of repositioning from a start point S, the locating device 10 was guided over the examination surface 34 of the workpiece 40 along a path 56. Here, a plurality of locating measurements were carried out at measurement positions 44 along the path 56, represented by small "x". The set of all measurement positions 44 is represented by the set of the position data $R_n=(x_n, y_n)$ assigned to the measurement positions 44 on the examination surface. Here, the position data represent two-dimensional coordinates for describing a measurement position 44, in particular any position, in relation to the examination surface 34. The at least two-dimensional map information item 20 is calculated on an equidistant grid 70 of position coordinates (grid points 72) from the established locating data $(S_{m,n})$ at the various measurement positions 44 ($R_n$) by means of the evaluation apparatus 30. The grid 70 of position coordinates is depicted in FIG. 6b. For reasons of clarity, the at least two-dimensional map information item 20 has been omitted from FIG. 6b—in principle, said map information item corresponds to locating data, for example in the form of measurement values, which are assigned to each measurement position 44 (i.e. all measurement positions 44 of $R_n$).

Preferably, further locating data should be established from the already established locating data $(S_{m,n})$ at the measurement positions 44 ($R_n$) by interpolation (alternatively also by extrapolation) in order to be able to advantageously enhance the at least two-dimensional map information item 20 with these calculated locating data. However, a calculation of interpolation values is only expedient if adjacent locating data are not situated too far away—stated more precisely, if the distance 74 to adjacent measurement positions 44, for which locating data were already established by locating measurements, is not too large (this distance 74 to adjacent locating data is depicted by small arrows in FIG. 6b). Therefore, the optimization method is based on the concept of establishing further "recommended" measurement positions 44', which are selected in such a way that this results in a spacing, which is advantageous for an interpolation, between already selected measurement positions 44 (of $R_n$) and these recommended measurement positions 44' with corresponding position coordinates $R_n'$. Therefore, the recommended measurement positions 44' with corresponding position coordinates $R_n'$ represent those measurement positions 44' on the examination surface 34 which should be selected for subsequent locating measurements, preferably by repositioning the locating device 10. If further locating measurements are carried out at exactly these recommended measurement positions 44' with corresponding position coordinates $R_n'$, an optimized gain of locating-related map information items 20 may be subsequently obtained as a consequence of an interpolation of further locating data, which, in particular, lie between then already available locating data with corresponding position coordinates $R_n$ and $R_n'$. In particular, a preferably maximum information gain may be obtained with as few further locating processes at recommended measurement positions 44' with corresponding position coordinates $R_n'$ as possible.

The grid 70 is resorted to for carrying out the interpolation. In particular, only grid points 72 (crossing points of the grid 70) are considered as possible locations (i.e. positions, likewise describable by position data (x, y)) for carrying out an interpolation; i.e., the grid points 72 represent those locations at which locating data should be calculated—or may be calculated for technical reasons—by means of an interpolation. All coordinates lying between such grid points 72 are not considered for carrying out the method according to the disclosure. Moreover, interpolated locating data from already measured locating data should only be calculated for those grid points 72, for which no locating information as a consequence of a locating measurement has previously been available and which lie within a convex envelope 76 (hatched region) of the already examined measurement positions 44 with corresponding position data $R_n$. The optimization problem therefore emerges as the following problem: by including locating data from which recommended measurement positions 44' with corresponding position coordinates $R_n'$, in particular measurement positions 44' with a predetermined and/or predeterminable number, is it possible to obtain an optimized gain of locating-related map information items 20 if the map information item 20, in addition to the locating data to be established at the measurement positions 44', is also complemented by interpolation using all locating data then available at the measurement positions 44 and 44', i.e. with corresponding position coordinates $R_n$ and $R_n'$, at the grid points 72.

The target function is therefore defined as a sum of deviations of distance variables from an average distance variable, which should be minimized in the optimization method. Here, a distance variable is calculated for each grid point—here shown using the example for A, B—within the convex envelope 76 as average distance of the grid point to N—in this case four—nearest measurement positions 44 with corresponding position data $R_n$. The average distance is represented in FIG. 6b as a circle with a radius $r_A$ or $r_B$. The distance 74 of a grid point 72 to the closest measurement positions 44 ($R_n$) is indicated by arrows. The average distance variable is calculated as an average value of the distance variables, represented here as average value of all circle radii $r_i = r_A, r_B, \ldots$.

In an alternative, or additional, preferred embodiment, the target function is defined as distribution function, wherein the value of the distribution function at a location scales with the dispersion $\sigma$ of the locating data, in particular locating data, in a neighborhood $\Omega$ of the location and the scaling factor depends on the number of locating data in the neighborhood $\Omega$.

Figure 7:
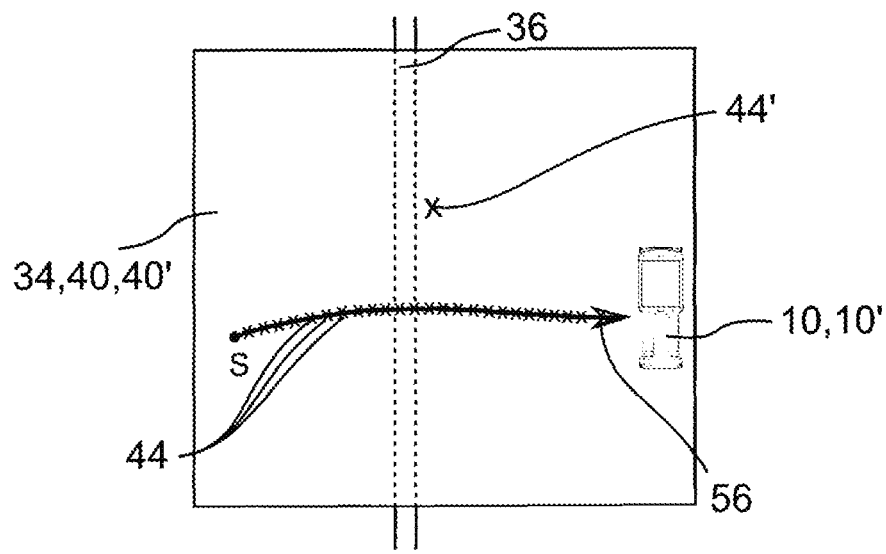
FIG. 7 shows a schematic visualization for an alternative embodiment of the target function
Figure 7:
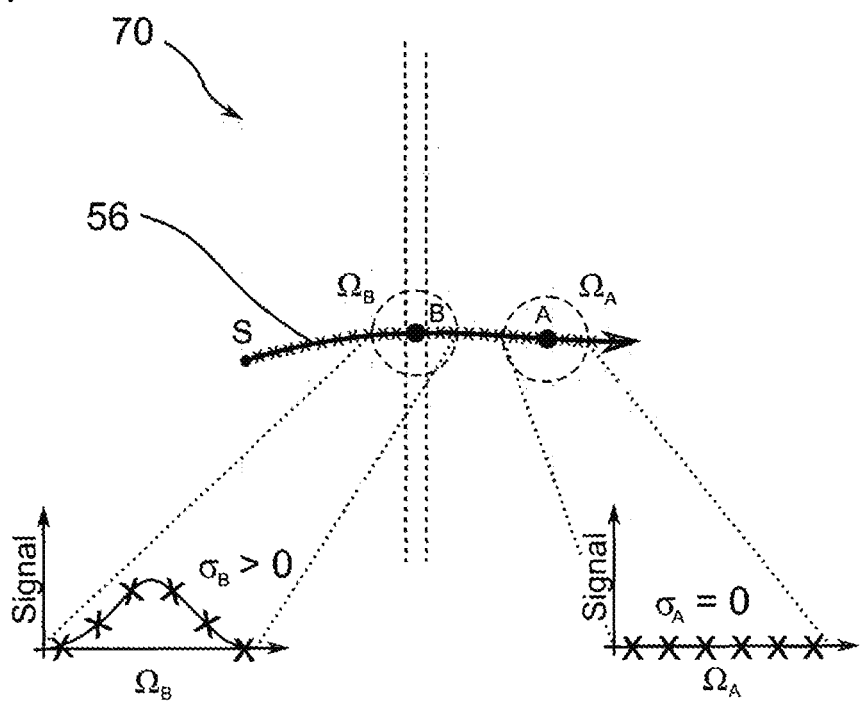

A much simplified, schematic illustration for visualizing the relationships is provided in FIG. 7. FIG. 7a once again depicts a workpiece 40 to be examined, for example a wall 40', in which a concealed object 36 to be located is present. As a consequence of repositioning from a start point S, the locating device 10 was guided over the examination surface 34 of the workpiece 40 along a path 56. Here, a plurality of locating measurements were carried out at measurement positions 44 along the path 56 (once again represented by small "x"). The set of all measurement positions 44 is represented by the set of the position data $R_n = (x_n, y_n)$ assigned to the measurement positions on the examination surface 34. Here, the position data represent two-dimensional coordinates for describing a measurement position 44, in particular any position, in relation to the examination surface 34. The at least two-dimensional map information item 20 is calculated from the established locating data $(S_{m,n})$ at the various measurement positions 44 with corresponding position coordinates $R_n$ by means of the evaluation apparatus 30. FIG. 7b once again depicts a grid 70 of position coordinates 72 which, however, at this point only serves for referring to the position data (in the form of coordinates). The grid 70 is not mandatory for carrying out the optimization method described here. For reasons of clarity, the at least two-dimensional map information item 20 has once again been omitted in FIG. 7b.

In addition to already established locating data at the measurement positions 44 ($R_n$), further locating data should be established in this model by locating measurements at recommended measurement positions 44' with corresponding position coordinates $R_n'$, i.e. at measurement positions 44' calculated by means of the optimization method, so as to be able to advantageously enhance the at least two-dimensional map information 20 with these locating data. A target function is defined from the already available locating data, the concept underlying said target function being that of determining, by optimization, further "recommended" measurement positions 44' which are of particular importance in respect of the map information item 20 to be generated. A statistical distribution function is considered as a criterion for this particular importance, in which a spatial density of already measured locating data and the dispersion $\sigma$ thereof within a defined, predeterminable neighborhood $\Omega$ of a possible measurement position 44' (represented by the locations A, B in an exemplary manner in FIG. 7b) are included for this measurement position 44' to be calculated. Hence, proceeding from this distribution, e.g. a Gaussian distribution, the target function can be defined and optimized for the already established locating data at the measurement positions 44 with corresponding position coordinates $R_n$, for example defined as the number of ideally uniquely identifiable sequences of locating data in the neighborhood $\Omega$ of a possible measurement position 44'. Preferably, much importance is assigned in this way to possible measurement positions 44' which have a high density of already measured locating data, particularly preferably a high dispersion $\sigma$, in the defined neighborhood $\Omega$ thereof. Particularly preferably, further possible measurement positions 44" in the vicinity of these possible measurement positions 44' are additionally assigned even more importance. The optimization, in particular maximization, of this target function yields those measurement positions 44' with corresponding position coordinates $R_n'$ of a predetermined and/or predeterminable number, the addition of which in a locating process yields an optimized gain of locating-related map information items 20.

The invention claimed is:

1. A method for operating an imaging locating device, the method comprising:
   generating an at least two-dimensional map information item by locating objects that are concealed under an examination surface;
   deriving, using an evaluation apparatus of the imaging locating device, an instruction for guiding a user in operating the imaging locating device in order to obtain an optimized gain of locating-related map information items, the instruction being derived from at least one of (i) locating data established by a locating apparatus of the imaging locating device, (ii) position data established by a position sensor of the imaging locating device, and (iii) system parameters of the imaging locating device; and outputting the instruction to the user of the imaging locating device; and calculating, using the evaluation apparatus, the instruction by optimizing a target function, wherein the optimization of the target function results in identification of measurement positions at which to take measurements in order to maximize the gain of locating-related map information items.

2. The method as claimed in claim 1, the calculating of the instruction further comprising:

calculating the instruction by optimizing the target function taking account of at least one parameter of a group of parameters at least comprising:
a distribution of the position data;
a signal-to-noise ratio of the locating data at different positions of the imaging locating device in relation to the examination surface;
a priori knowledge about at least one of properties of employed evaluation and interpolation algorithms;
a deviation in a correlation of adjacent locating data of the locating data; and
knowledge obtained at least one of a priori and during a locating process about probabilities of deviations between an expected position and an actual position of the locating device in relation to the examination surface.

3. The method as claimed in claim 1, further comprising:
defining the target function, with reference to grid points of a grid and measurement positions, as a sum of deviations of distance variables from an average distance variable;
calculating a distance variable for each grid point of at least a subset of grid points of the grid as an average distance of the grid point from N next measurement positions; and
calculating the average distance variable as a mean value of the distance variables.

4. The method as claimed in claim 1, further comprising:
defining the target function as a distribution function, a value of the distribution function at one location being scaled with a dispersion of the locating data in surroundings of the location and a scaling factor that depends on a number of locating data in the surroundings.

5. The method as claimed in claim 1, further comprising:
calculating, using the evaluation apparatus, the instruction as at least one trajectory, along which the locating device is guided in order to obtain the optimized gain of the locating-related map information items.

6. The method as claimed in claim 5, further comprising:
outputting the at least one trajectory as at least one of a polyline and target points displayed on a display apparatus.

7. The method as claimed in claim 5, further comprising:
outputting the at least one trajectory by at least one of coloring and varying a transparency of the at least two-dimensional map information item displayed on a display apparatus as a map.

8. The method as claimed in claim 5, further comprising:
outputting a course of the at least one trajectory using directional indicators.

9. The method as claimed in claim 8, the outputting of the course further comprising:
outputting the course of the at least one trajectory using arrows.

10. An imaging locating device, the imaging locating device being hand-held, the imaging locating device comprising:
a locating apparatus configured to detect locating data in relation to objects that are concealed under an examination surface;
a position sensor configured to detect position data of the locating device in relation to the examination surface; and
an evaluation apparatus configured to:
determine an at least two-dimensional map information item by assigning locating data to position data;
calculate an instruction for a user of the imaging locating device from at least one of the locating data, the position data, and system parameters, the instruction being calculated by calculating at least one trajectory along which the user should move the imaging locating device in order to obtain an optimized gain of locating-related map information items; and
output the instruction to the user of the imaging locating device;
wherein the evaluation apparatus calculates the instruction by optimizing a target function, and
wherein the optimization of the target function results in identification of measurement positions at which to take measurements in order to maximize the gain of locating-related map information items.

11. The imaging locating device as claimed in claim 10, further comprising:
at least one first display apparatus configured to display the at least one trajectory.

12. The imaging locating device as claimed in claim 10, further comprising:
at least one second display apparatus configured to display at least the at least two-dimensional map information item as a map.

13. The imaging locating device as claimed in claim 10, further comprising:
at least one signal output apparatus configured to output directional indicators in at least one of an optical, acoustic, and tactile manner.

14. A method for operating an imaging locating device, the method comprising:
generating an at least two-dimensional map information item by locating objects that are concealed under an examination surface;
deriving, using an evaluation apparatus of the imaging locating device, an instruction for guiding the imaging locating device in order to obtain an optimized gain of locating-related map information items, the instruction being derived from at least one of (i) locating data established by a locating apparatus of the imaging locating device, (ii) position data established by a position sensor of the imaging locating device, and (iii) system parameters of the imaging locating device;
calculating, using the evaluation apparatus, the instruction by optimizing a target function;
defining the target function, with reference to grid points of a grid and measurement positions, as a sum of deviations of distance variables from an average distance variable;

calculating a distance variable for each grid point of at least a subset of grid points of the grid as an average distance of the grid point from N next measurement positions; and calculating the average distance variable as a mean value of the distance variables.

* * * * *

UNITED STATES PATENT AND TRADEMARK OFFICE
CERTIFICATE OF CORRECTION

PATENT NO. : 10,690,804 B2  
APPLICATION NO. : 15/320785  
DATED : June 23, 2020  
INVENTOR(S) : Tobias Zibold Page 1 of 1

It is certified that error appears in the above-identified patent and that said Letters Patent is hereby corrected as shown below:

On the Title Page

Before item (51), please add the following priority claim:
-- (30)   Foreign Application Priority Data
Jun. 25, 2014    (DE) .................. 10 2014 212 131.0 --.

In the Specification

At Column 1, Line 8, "Jun. 25, 2104" should read -- Jun. 25, 2014 --.

Signed and Sealed this  
Twenty-second Day of September, 2020

Andrei Iancu  
*Director of the United States Patent and Trademark Office*